(12) United States Patent
Alderton

(10) Patent No.: US 11,409,909 B1
(45) Date of Patent: Aug. 9, 2022

(54) DATA PRIVACY ENFORCERS

(71) Applicant: Robert Alderton, Ferndale, MI (US)

(72) Inventor: Robert Alderton, Ferndale, MI (US)

( * ) Notice: Subject to any disclaimer, the term of this patent is extended or adjusted under 35 U.S.C. 154(b) by 0 days.

(21) Appl. No.: 17/470,689

(22) Filed: Sep. 9, 2021

Related U.S. Application Data

(60) Provisional application No. 63/075,999, filed on Sep. 9, 2020.

(51) Int. Cl.
*G06F 21/62* (2013.01)
*G06F 16/953* (2019.01)
*G06N 20/00* (2019.01)

(52) U.S. Cl.
CPC ........ *G06F 21/6245* (2013.01); *G06F 16/953* (2019.01); *G06F 21/629* (2013.01); *G06N 20/00* (2019.01)

(58) Field of Classification Search
CPC .. G06F 21/6245; G06F 21/629; G06F 16/953; G06F 2221/2143; G06N 20/00
See application file for complete search history.

(56) References Cited

U.S. PATENT DOCUMENTS

| 10,079,820 | B2 | 9/2018 | Kolli et al. | |
|---|---|---|---|---|
| 11,270,025 | B2 * | 3/2022 | Arnold | G06F 21/602 |
| 2003/0217060 | A1 * | 11/2003 | Stockton | H04L 67/306 |
| 2004/0203597 | A1 * | 10/2004 | Pitt | H04M 3/42153 |
| | | | | 455/411 |
| 2011/0321167 | A1 * | 12/2011 | Wu | G06Q 30/0241 |
| | | | | 726/26 |
| 2014/0244399 | A1 | 8/2014 | Orduna et al. | |
| 2014/0373182 | A1 * | 12/2014 | Peri | G06F 21/6245 |
| | | | | 726/30 |
| 2015/0020083 | A1 * | 1/2015 | Ben-Itzhak | H04N 21/818 |
| | | | | 719/320 |
| 2016/0205208 | A1 * | 7/2016 | Yang | H04L 67/22 |
| | | | | 709/224 |

OTHER PUBLICATIONS

Bannihatti Kumar V, et al. Finding a choice in a haystack: Automatic extraction of opt-out statements from privacy policy text. In Proceedings of the Web Conference. Apr. 20, 2020 (pp. 1943-1954). (Year: 2020).*

* cited by examiner

*Primary Examiner* — Robert B Leung
(74) *Attorney, Agent, or Firm* — Miller IP Law LLC

(57) ABSTRACT

Data privacy enforcers may include providing an opt-out application that identifies user applications that have an individual's personal data and directs the individual to the privacy page for the user applications. The individual may input personal information into the opt-out application that the individual wishes to remain private. The opt-out application may search the internet for the individual's personal information and may provide a list of applications that publicly share the individual's personal information. The individual may select one of the user applications. Upon selection, the opt-out application may direct the individual, in the opt-out application, to the privacy page for the user application. The opt-out application may walk the individual through the options and setting the individual's privacy level for the user application to the individual's preference. The process may iterate through additional user applications identified by the opt-out application as having the individual's information.

20 Claims, 24 Drawing Sheets

900

Record Removal Request

At AdvancedBackgroundChecks.com, we understand and respect your need for privacy. If you feel you need to opt out your records from view on our site, we will honor that. Simply follow the directions below, in the order listed, to make your formal opt-out request.

Enter your email address

Agree to the terms and conditions

Complete the Captcha challenge

Click 'Begin Removal Process' button

Find the record you want to remove by performing a search, then click on "SEE FULL INFO" button Click on the "Remove my record" button located at the top of the page near the subject's name. You MUST be on the "details" page in order to remove the record.

A confirmation email will be sent to the email address you entered. Click the confirmation link in the email.

You will be presented with a record removal confirmation page (Your record will be removed within 72 hours)

DATA PRIVACY ENFORCERS

CROSS REFERENCE TO RELATED APPLICATIONS

The present application is a continuation of U.S. Non-Provisional Patent Application No. 63/075,999 entitled "SYSTEMS AND METHODS FOR DATA PRIVACY", filed on 9 Sep. 2020. The entire contents of the above-listed application are hereby incorporated by reference for all purposes.

BACKGROUND

Data collection has become ubiquitous in business, and particularly for businesses that use the internet to interact with their customers and/or clients. Some businesses trade in data; they may have a platform that individuals use, such as a social media platform, and may collect data on the individuals. The data may be anonymized or may be specific to an individual. The data may be provided to another business, such as a business that will use the data for marketing of its products and/or services. The data may be provided to another business that uses the data to identify individuals. The data may be made available to the public. Some individuals may want to protect their data from being given to marketers, the public, and/or other entities. Laws and regulations may dictate how individuals' data may be used by a business that collects such data.

BRIEF DESCRIPTION OF THE DRAWINGS

The present description will be understood more fully when viewed in conjunction with the accompanying drawings of various examples of data privacy enforcers. The description is not meant to limit the data privacy enforcers to the specific examples. Rather, the specific examples depicted and described are provided for explanation and understanding of data privacy enforcers. Throughout the description, the drawings may be referred to as drawings, figures, and/or FIGs.

DETAILED DESCRIPTION

Figure 1:
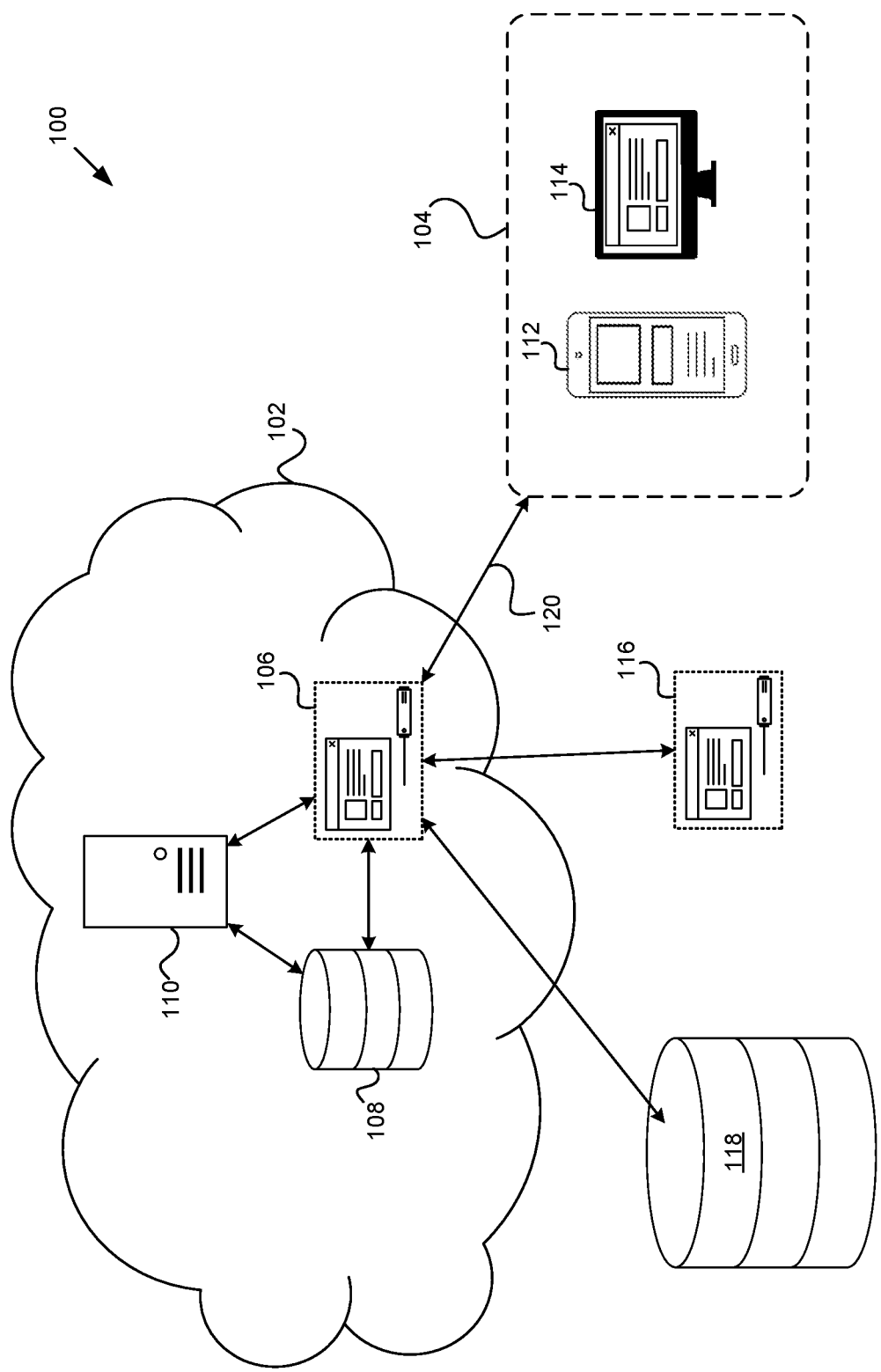
FIG. 1 illustrates a data privacy enforcer system, according to an embodiment.

Data privacy enforcers as disclosed herein will become better understood through a review of the following detailed description in conjunction with the figures. The detailed description and figures provide merely examples of the various embodiments of data privacy enforcers. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Data protection conventionally consists of disparate, unconnected policies and options that vary widely from one application (e.g., a website, a web-connected mobile application, a social media site, and so forth) to another. Each application an individual uses may have its data protection policies, practices, and options. Some applications adhere to similar formats, but even finding data protection information for such applications varies widely. Some applications have take-it-or-leave-it data protection policies that provide individuals that use the application with no options on how their personal data is used by the application provider. Some applications are on the opposite end of the spectrum, providing a plethora of options to the individual, some of which may be vague to an individual unfamiliar with typical data protection policies, practices, and options. As more applications are developed and are used by individuals, an increasing variety of data protection policies, practices, and options, and where those are found in the applications, will develop. This increases the potential for an individual's data to be used and/or made available to the public in a way the individual has a legal right to protect against but does not have the time or know-how to protect.

Implementations of data privacy enforcers as described herein may address some or all of the problems described above. Data privacy enforcers may include providing an opt-out application that identifies user applications that have an individual's personal data and directs the individual to the privacy page for the user applications. The individual may input personal information into the opt-out application that the individual wishes to remain private. The opt-out application may search the internet for the individual's personal information and may provide a list of applications that publicly share the individual's personal information. The individual may select one of the user applications. Upon selection, the opt-out application may direct the individual, in the opt-out application, to the privacy page for the user application. The opt-out application may walk the individual through the options and setting the individual's privacy level for the user application to the individual's preference. The process may iterate through additional user applications identified by the opt-out application as having the individual's information.

The opt-out application may be private such that the application is not searchable by search engines, e.g., search engines that use web crawlers to mine online data. The opt-out application may be accessible to users and/or individuals that have invite codes. For example, a method of the opt-out code may include displaying a button for requesting an invite code. The button may behind an authentication wall, i.e. may be accessed by a user that is logged in to the opt-out application. The method may include receiving input that may include a click on the button. The method may include, in response to receiving the input, generating an authenticator. The authenticator may be a code. The code may be protected, such as by a cryptographic hash function. The method may include receiving, with the input, contact information for a non-user. The method may include transmitting the authenticator to the non-user. The method may include providing the authenticator to a current user of the opt-out application. The method may include transmitting a link to a registration page of the opt-out application with the authenticator. The method may include displaying a registration page. The registration page may include input fields for information about the non-user such as personal information, name, email address, and so forth. The registration page may include an input field for the authenticator. The method may include receiving the authenticator and/or the personal information. The method may include verifying the authenticator. The method may include, in response to the authenticator being verified, registering the non-user to become a current user.

The opt-out application may automatically and/or continuously search the internet for an individual's personal information. A method of the opt-out application may include establishing a personal information database that includes information about the individual that the individual wishes to keep private, e.g., off of publicly available internet sources. The method may include establishing a public site database. The public site database may include a list of websites that make personal information available to the public. The method may include receiving a web address for a public site and inputting the web address into the public site database. The web address may be received via an input field. The method may include generating a web crawler that searches the internet for public sites. The method may include activating the web crawler. The method may include receiving public site information from the web crawler. The method may include automatically or manually training a machine-learning algorithm to identify an opt-out process on a public site. The method may include, by the training, establishing an automated opt-out bot. The automated opt-out bot may be a machine-learning algorithm trained to identify and execute an opt-out process of a public site. The method may include retrieving personal information from the personal information database. The method may include inputting personal information from the personal information database into an opt-out field that is part of the opt-out process. The personal information may be identified, retrieved, and/or input by the automated opt-out bot. The method may include receiving a confirmation the personal information has been removed from the public site or that the personal information is opted out of public sharing on the public site. The method may include sending the confirmation to a user associated with the personal information.

The California Consumer Privacy Act (CCPA) is a recent statute enacted in the state of California, which is intended to provide for enhanced privacy and consumer protection rights for residents of that state. In general, the CCPA provides California residents with a right to know the personal data collected about them, know whether the data is sold or disclosed and to whom, opt-out of the sale of their personal data, request deletion of their personal data, and not be discriminated against for exercising the foregoing rights. Most large businesses engaging in significant transactions of personal data are required to comply with these rules.

However, even though a consumer may have a legal right to opt-out of the collection, use, or sale of their personal information the process of opting-out can still be cumbersome, whether intentionally or unintentionally. Thus, a streamlined process of executing one or more removals of a consumer's personal information may provide for enhanced realization of the consumer's privacy rights, including, for example, those rights conferred by the CCPA for California residents.

The opt-out application may simplify and centralize the process of protecting the individual's private information. In some cases, the individual may not be aware of all the user applications that make the individual's private information available to the public. The opt-out application may identify such user applications by correlating the user's private information with information available to the public through the user applications. Thus, the opt-out application may identify user applications the individual did not know were sharing the individual's private information. The opt-out application may eliminate the confusion of the various processes and locations in the various user applications for privacy options by taking the individual directly to such the privacy pages for the user applications. The instructions may make vague privacy options clear to the individual by using terminology that is familiar to the individual and the same regardless of the specific language used by specific user applications. Thus, an individual may have greater control over how their private information is shared publicly than has otherwise been previously available.

FIG. 1 illustrates a data privacy enforcer system 100, according to an embodiment. The data privacy enforcer system 100 includes internal and external data resources for managing a project. The data privacy enforcer system 100 may result in reduced memory allocation at client devices and may conserve memory resources for application servers.

The data privacy enforcer system 100 may include a cloud-based data management system 102 and a user device 104. The cloud-based data management system 102 may include an application server 106, a database 108, and a data server 110. The user device 104 may include one or more devices associated with user profiles of the data privacy enforcer system 100, such as a smartphone 112 and/or a personal computer 114. The data privacy enforcer system 100 may include external resources such as an external application server 116 and/or an external database 118. The various elements of the data privacy enforcer system 100 may communicate via various communication links 120. An external resource may generally be considered a data resource owned and/or operated by an entity other than an entity that utilizes the cloud-based data management system 102 and/or the user device 104.

The data privacy enforcer system 100 may be web-based. The user device 104 may access the cloud-based data management system 102 via an online portal set up and/or managed by the application server 106. The data privacy enforcer system 100 may be implemented using a public internet. The data privacy enforcer system 100 may be implemented using a private intranet. Elements of the data privacy enforcer system 100, such as the database 108 and/or the data server 110, may be physically housed at a location remote from an entity that owns and/or operates the data privacy enforcer system 100. For example, various elements of the data privacy enforcer system 100 may be physically housed at a public service provider such as a web services provider. Elements of the data privacy enforcer system 100 may be physically housed at a private location, such as at a location occupied by the entity that owns and/or operates the data privacy enforcer system 100.

The communication links 120 may be direct or indirect. A direct link may include a link between two devices where information is communicated from one device to the other without passing through an intermediary. For example, the direct link may include a Bluetooth™ connection, a Zigbee® connection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a wireless fidelity (WiFi) connection where data is passed through a WiFi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links 120, may refer to any of the aforementioned indirect communication links.

Figure 2:
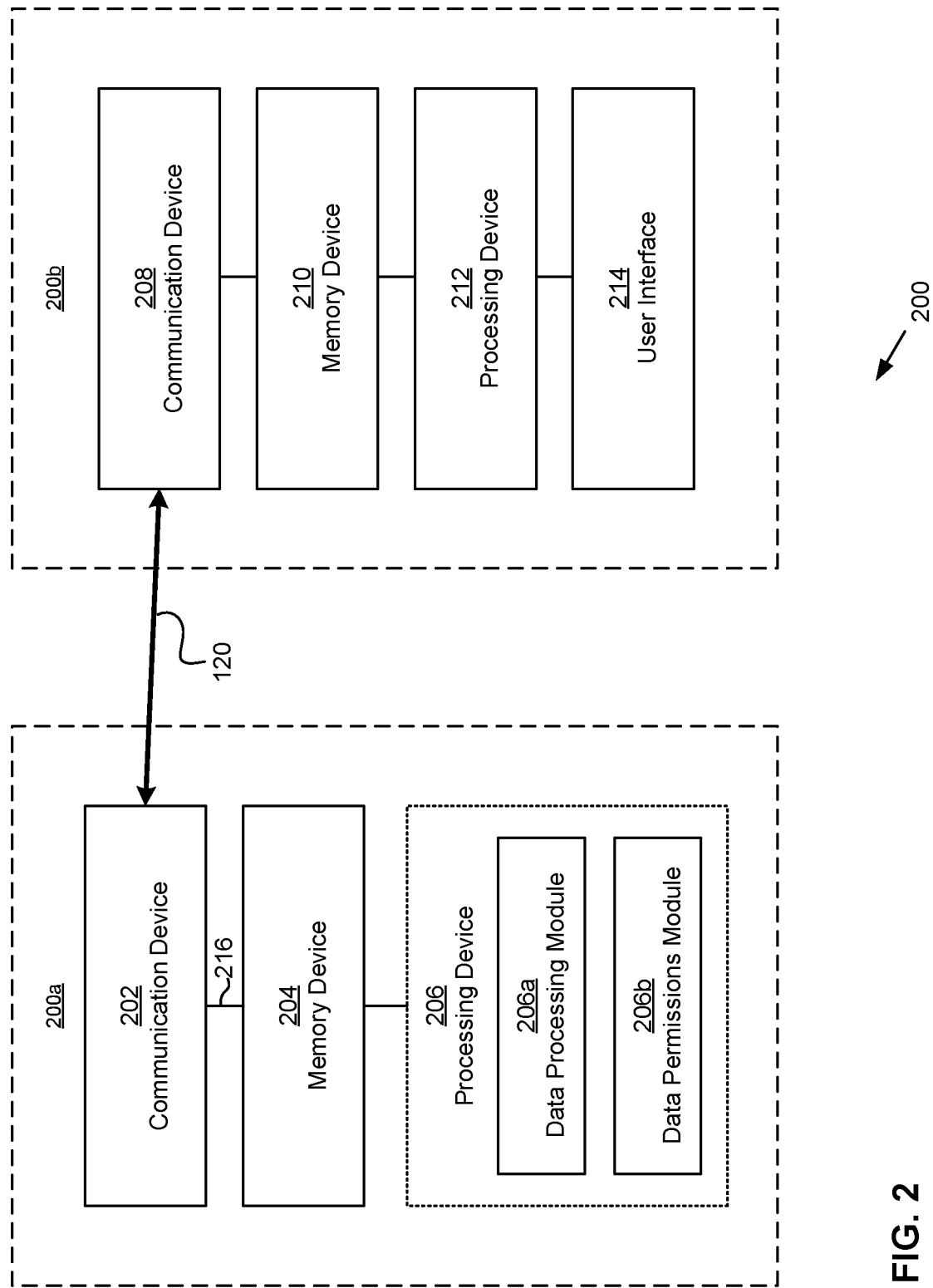
FIG. 2 illustrates a device schematic for various devices used in the data privacy enforcer system, according to an embodiment.

FIG. 2 illustrates a device schematic 200 for various devices used in the data privacy enforcer system 100, according to an embodiment. A server device 200a may moderate data communicated to a client device 200b based on data permissions to minimize memory resource allocation at the client device 200b.

The server device 200a may include a communication device 202, a memory device 204, and a processing device 206. The processing device 206 may include a data processing module 206a and a data permissions module 206b, where module refers to specific programming that governs how data is handled by the processing device 206. The client device 200b may include a communication device 208, a memory device 210, a processing device 212, and a user interface 214. Various hardware elements within the server device 200a and/or the client device 200b may be interconnected via a system bus 216. The system bus 216 may be and/or include a control bus, a data bus, and address bus, and so forth. The communication device 202 of the server device 200a may communicate with the communication device 208 of the client device 200b.

The data processing module 206a may handle inputs from the client device 200a. The data processing module 206a may cause data to be written and stored in the memory device 204 based on the inputs from the client device 200b. The data processing module 206a may receive data stored in the memory device 204 and output the data to the client device 200a via the communication device 202. The data permissions module 206b may determine, based on permissions data stored in the memory device, what data to output to the client device 200b and what format to output the data in (e.g., as a static variable, as a dynamic variable, and so forth). For example, a variable that is disabled for a particular user profile may be output as static. When the variable is enabled for the particular user profile, the variable may be output as dynamic.

The server device 200a may be representative of the cloud-based data management system 102. The server device 200a may be representative of the application server 106. The server device 200a may be representative of the data server 110. The server device 200a may be representative of the external application server 116. The memory device 204 may be representative of the database 108 and the processing device 206 may be representative of the data server 110. The memory device 204 may be representative of the external database 118 and the processing device 206 may be representative of the external application server 116. For example, the database 108 and/or the external database 118 may be implemented as a block of memory in the memory device 204. The memory device 204 may further store instructions that, when executed by the processing device 206, perform various functions with the data stored in the database 108 and/or the external database 118.

Similarly, the client device 200b may be representative of the user device 104. The client device 200b may be representative of the smartphone 112. The client device 200b may be representative of the personal computer 114. The memory device 210 may store application instructions that, when executed by the processing device 212, cause the client device 200b to perform various functions associated with the instructions, such as retrieving data, processing data, receiving input, processing input, transmitting data, and so forth.

As stated above, the server device 200a and the client device 200b may be representative of various devices of the data privacy enforcer system 100. Various of the elements of the data privacy enforcer system 100 may include data storage and/or processing capabilities. Such capabilities may be rendered by various electronics for processing and/or storing electronic signals. One or more of the devices in the data privacy enforcer system 100 may include a processing device. For example, the cloud-based data management system 102, the user device 104, the smartphone 112, the personal computer 114, the external application server 116, and/or the external database 118 may include a processing device. One or more of the devices in the data privacy enforcer system 100 may include a memory device. For example, the cloud-based data management system 102, the user device 104, the smartphone 112, the personal computer 114, the external application server 116, and/or the external database 118 may include the memory device.

The processing device may have volatile and/or persistent memory. The memory device may have volatile and/or persistent memory. The processing device may have volatile memory and the memory device may have persistent memory. Memory in the processing device may be allocated dynamically according to variables, variable states, static objects, and permissions associated with objects and variables in the data privacy enforcer system 100. Such memory allocation may be based on instructions stored in the memory device. Memory resources at a specific device may be conserved relative to other systems that do not associate variables and other object with permission data for the specific device.

The processing device may generate an output based on an input. For example, the processing device may receive an electronic and/or digital signal. The processing device may read the signal and perform one or more tasks with the signal, such as performing various functions with data in response to input received by the processing device. The processing device may read from the memory device information needed to perform the functions. For example, the processing device may update a variable from static to dynamic based on a received input and a rule stored as data on the memory device. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various of the devices in the data privacy enforcer system 100 may include data communication capabilities. Such capabilities may be rendered by various electronics for transmitting and/or receiving electronic and/or electromagnetic signals. One or more of the devices in the data privacy enforcer system 100 may include a communication device, e.g., the communication device 202 and/or the communication device 208. For example, the cloud-based data management system 102, the user device 104, the smartphone 112, the personal computer 114, the application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing device, for communicating over a Wifi and/or cellular network. As used herein, "communication device" "communication component," and/or "communication unit" may be used generically herein to refer to any or all of the aforementioned elements and/or features of the communication component.

Various of the elements in the data privacy enforcer system 100 may be referred to as a "server." Such elements may include a server device. The server device may include a physical server and/or a virtual server. For example, the server device may include one or more bare-metal servers. The bare-metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human-readable text.

Various of the devices in the data privacy enforcer system 100, including the server device 200a and/or the client device 200b, may include a user interface for outputting information in a format perceptible by a user and receiving input from the user, e.g., the user interface 214. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

Various methods are described below. The methods may be implemented by the data analysis system 100 and/or various elements of the data analysis system described above. For example, inputs indicated as being received in a method may be input at the client device 200b and/or received at the server device 200a. Determinations made in the methods may be outputs generated by the processing device 206 based on inputs stored in the memory device 204. Correlations performed in the methods may be executed by the correlation module 206a. Inference outputs may be generated by the inference module 206b. Key data and/or actionable data may be stored in the knowledge database 204b. Correlations between key data and actionable data may be stored in the knowledge database 204b. Outputs generated in the methods may be output to the output database 204c and/or the client device 200b. In general, data described in the methods may be stored and/or processed by various elements of the data analysis system 100.

Figure 3A:
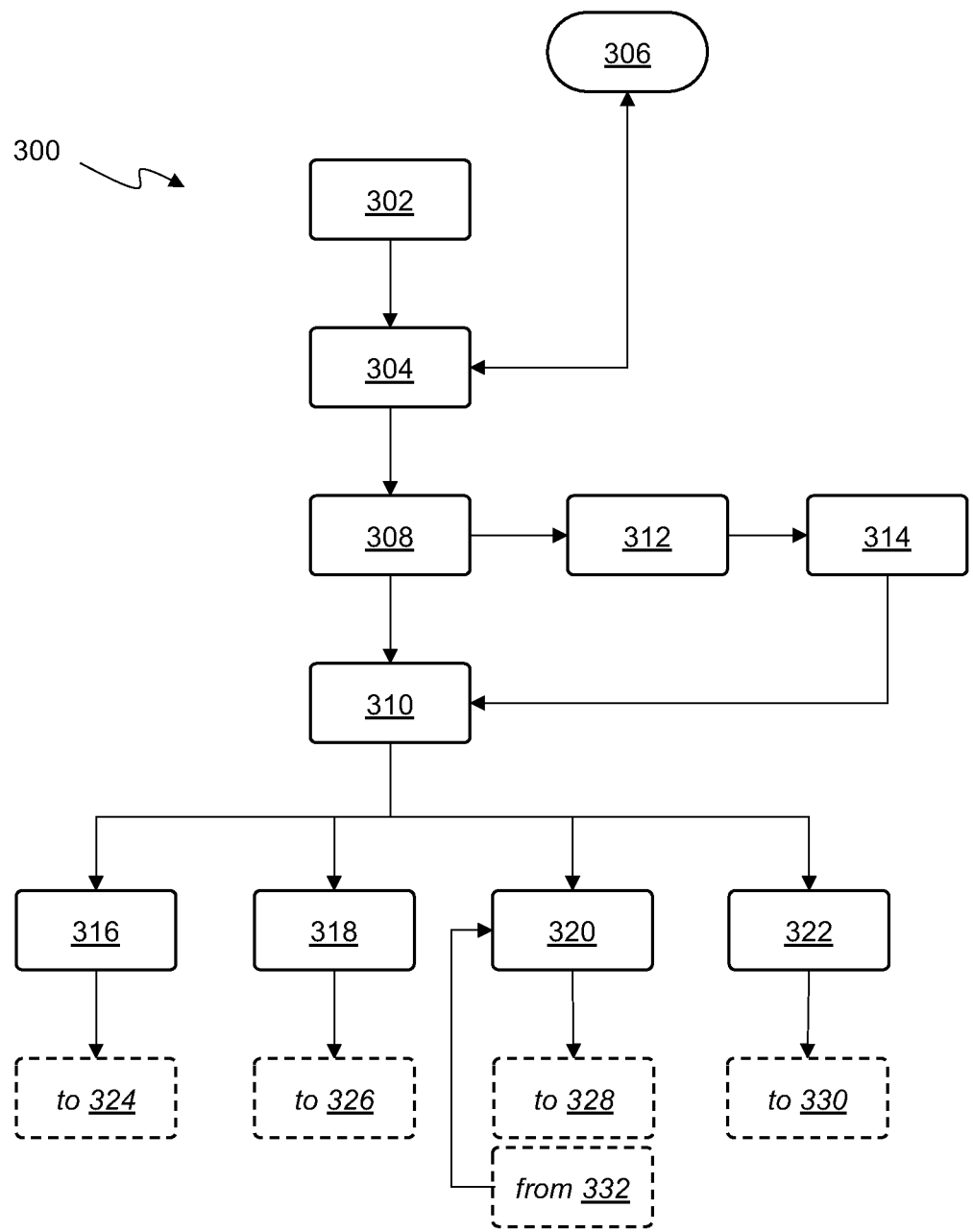
FIG. 3A illustrates a method of correlating an opt-out application account with a user account using an individual's personal information, according to an embodiment.

FIG. 3A illustrates a method 300 of correlating an opt-out application account with a user account using an individual's personal information, according to an embodiment. The opt-out application may provide a centralized system enabling an individual to identify user applications that make the individual's private information publicly available. Such user applications may not be known to the individual, that is, the individual may not be aware that such user applications collected and are not making public the individual's private information. Such user applications may have privacy policies and/or practices that are vague and/or difficult for the individual to understand. Such user applications may have unclear opt-out instructions, or the page for opting out may be difficult for the individual to find. In cases where the individual has many accounts with various different policies and practices, the opt-out application may streamline the process of protecting the individual's private information. The opt-out application may save the individual a significant amount of time and may identify exposure the individual may not have otherwise been aware of.

The method 300 may include, at 304, opening the opt-out application (e.g., "DO NOT SELL MY NAME data app") on a computer, which may be prompted by a notification 306. The opt-out application may be installed on a computer that runs an operating system 302 (e.g., a personal computer operating system such as Windows® or MacOS®, a mobile operating system such as iOS® or Android®, or via a web browser client that makes calls to a remote server). The method 300 may include authenticating user credentials at 308 (e.g., "Is logged In?", "Registration Form," and/or "Authorization/Login"). The method 300 may include displaying a main menu at 310. If a user is not registered, the user may register at 312 using a registration form, and then proceed to an authorization or login at 314 and then to the main menu at 310.

The main menu may include a search engine link. The method 300 may include, at 316, receiving an input selecting the search engine link and/or displaying information associated with the search engine link. For example, the search engine link may open a new page with a list of selectable search engine links. As another example, the search engine link may be a drop-down menu that displays a list of selectable search engine links.

The main menu may include a social media application link. The method 300 may include, at 318, receiving an input selecting the social media application link and/or displaying information associated with the social media application link. For example, the social media application link may open a new page with a list of selectable social media application links. As another example, the social media application link may be a drop-down menu that displays a list of social media application links.

The main menu may include a manual input link. The method 300 may include, at 320, receiving an input selecting the manual input link and/or displaying information associated with the manual input link. For example, the manual input link may open a new page and/or may open an input field where a user may input a name of a user application that may have private information about an individual. The user may be the individual or another person.

The main menu may include an account settings link. The method 300 may include, at 322, receiving an input selecting the account settings link and/or displaying information associated with the account settings link. For example, the account settings link may open to a new page or may display a drop-down list of various account settings.

Figure 3B:
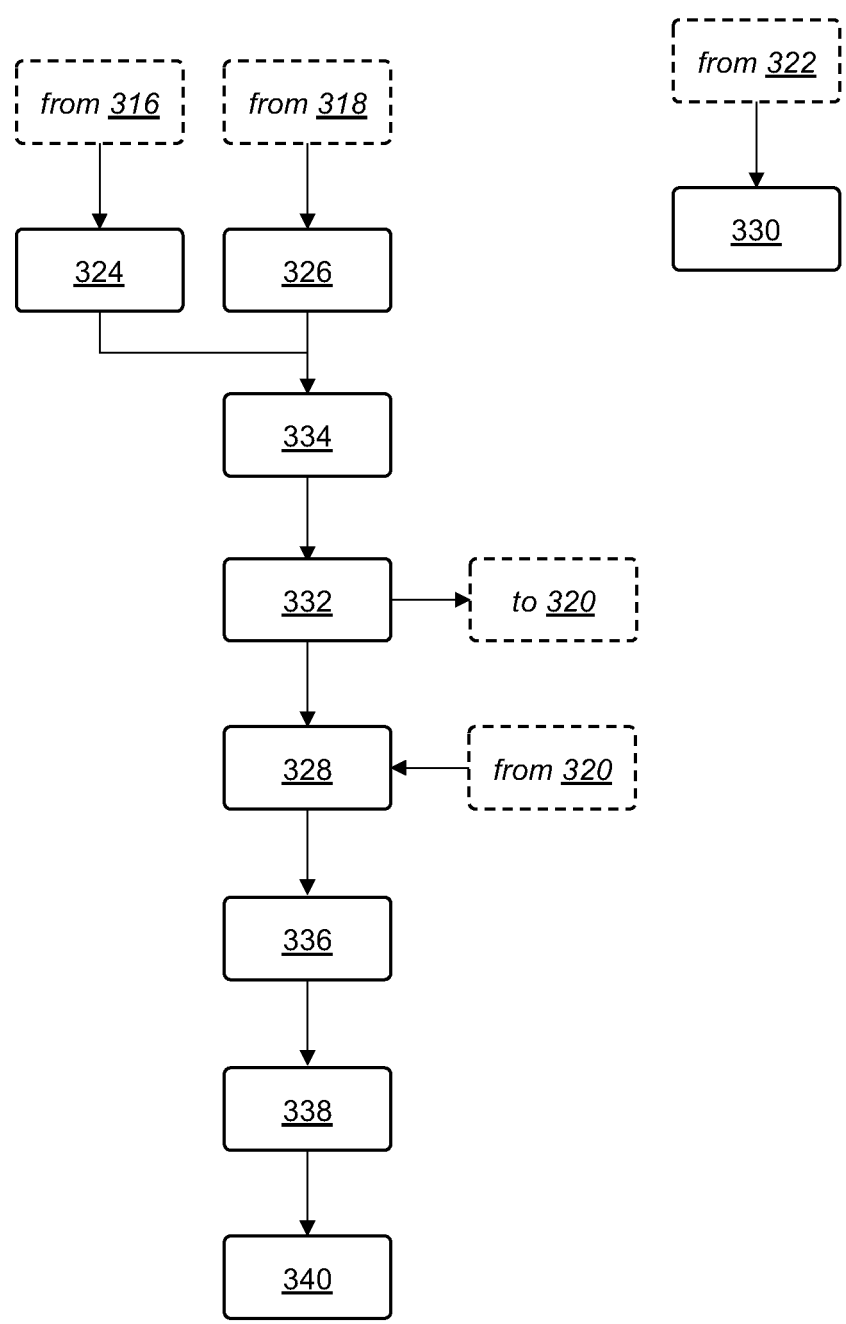
FIG. 3B illustrates a continuation of the method illustrated in FIG. 3A, according to an embodiment.

FIG. 3B illustrates a continuation of the method 300, according to an embodiment. The method 300 may include, at 324, displaying input fields where the user may input private information about the individual that the individual does not want to be made publicly available or used by parties to which the individual did not grant express, direct permission. Such private information may include the individual's name, birthday, social security or tax identification number, address, phone number, employer, income, relatives, driver's license information, physical features (e.g., height, weight, eye color, hair color), age, gender, race, ethnicity, bank information, credit card information, financial information, demographic information, email address(es), username(s), password(s), aliases, coworkers, associates, friends, biometric information, and so forth. The method 300 may include receiving one or more inputs of the individual's private information.

The method 300 may include, at 326, receiving an input to search for results related to the individual's private information. The method 300 may include, at 334, in response to the search instruction, searching selected applications for the private information. The selected applications may include search engines (e.g., the private information is held by the search engine and/or the search engine returns results for the private information), social media applications (e.g., the private information is found in social media content or is associated with an account of the social media application), and/or another searchable site which may be manually inputted by the user.

The method 300 may include, at 328, displaying results of the search. The results may include search engines, social media applications, and/or other searchable sites that were found by the opt-out application to have one or more pieces of the private information searched for. The method 300 may include, at 328, displaying a prompt for confirmation that the search results correspond to the individual. The method 300 may include, at 336, displaying an input field where the user may input verification that the displayed results correspond to the individual. The method 300 may include verifying the information input into the input field matches the search results. The method 300 may include, at 338, authenticating the search results based on the verification. The authentication may include a confirmation number, for example.

The method 300 may include, at 340, transmitting the authentication to the user, the individual, or another party designated in the opt-out application to receive the authentication. The method 300 may include, at 330, in response to receiving an input selecting the account settings link, displaying various information about the opt-out application account. The information may include notification settings, privacy settings (e.g., settings on how the user's information or individual's information may be used and/or shared by the opt-out application), security settings (e.g., username, password, login methods, two-factor authentication settings, and so forth), help information, information about the opt-out application (e.g., the developer, the owner, copyright information, contact information for the developer, and so forth), and so forth.

Figure 4A:
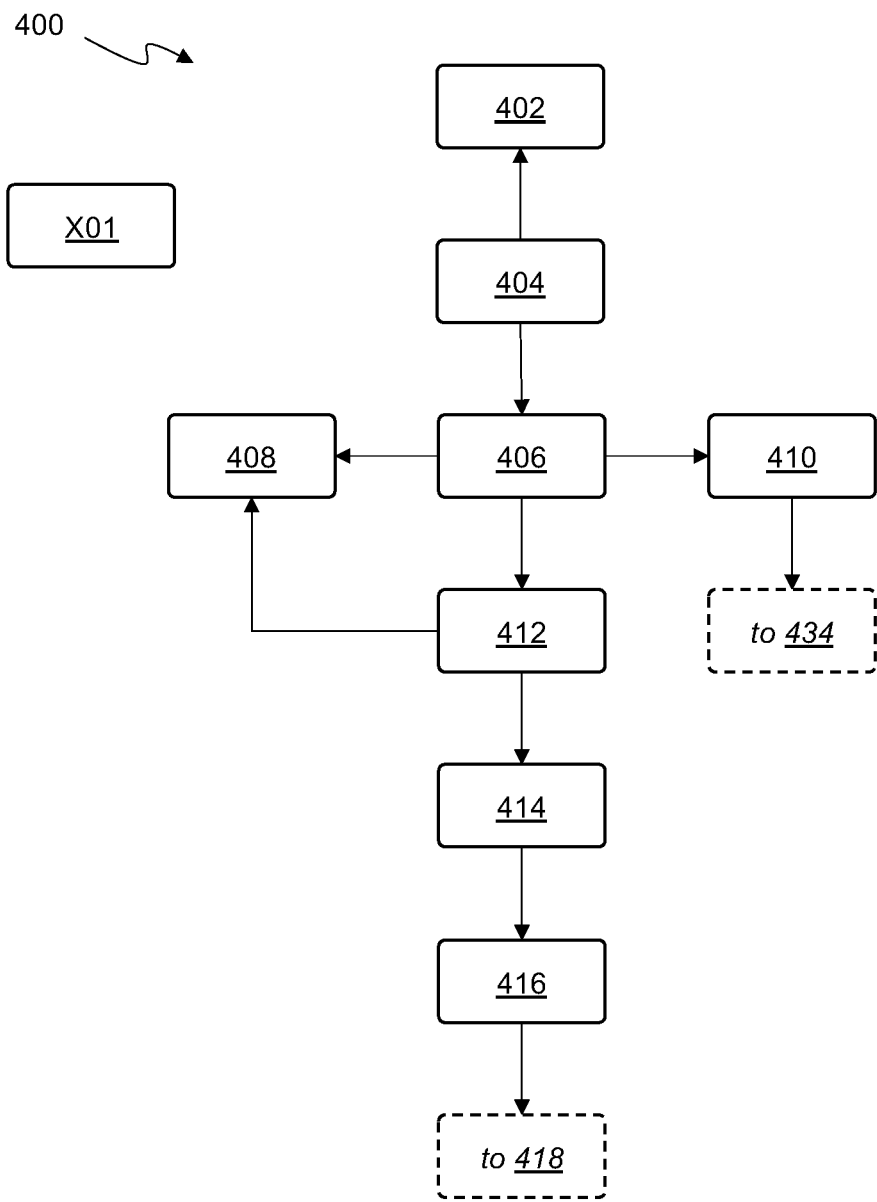
FIG. 4A illustrates a method of confirming, via the opt-out application, a user application is blocked from making the individual's personal information available to the public or other entities, according to an embodiment.

FIG. 4A illustrates a method 400 of confirming, via the opt-out application, a user application is blocked from making the individual's personal information available to the public or other entities, according to an embodiment. The method 400 may include various elements of the method 300 in addition to those described below. The method 400 may include, at 404, opening the opt-out application (e.g., "DO NOT SELL MY NAME data app") on a computer. The opt-out application may be installed on a computer that runs an operating system 402 (e.g., a personal computer operating system such as Windows® or MacOS®, a mobile operating system such as iOS® or Android®, or via a web browser client that makes calls to a remote server). The method 400 may include, at 406, selecting a social media application 408. The method 400 may include, at 412, displaying the opt-out application, receiving inputs (e.g., a selection of sites to search and/or private information about the individual). The method 400 may include, at 414, displaying search results, and so forth. The method 400 may include, at 416, displaying a link to display details of marked search result records. The details may include the name of the site, the information about the individual found on the site, privacy settings associated with the information, and so forth. The method 400 may include, at 410, receiving an input selecting the manual input link and/or displaying information associated with the manual input link.

Figure 4B:
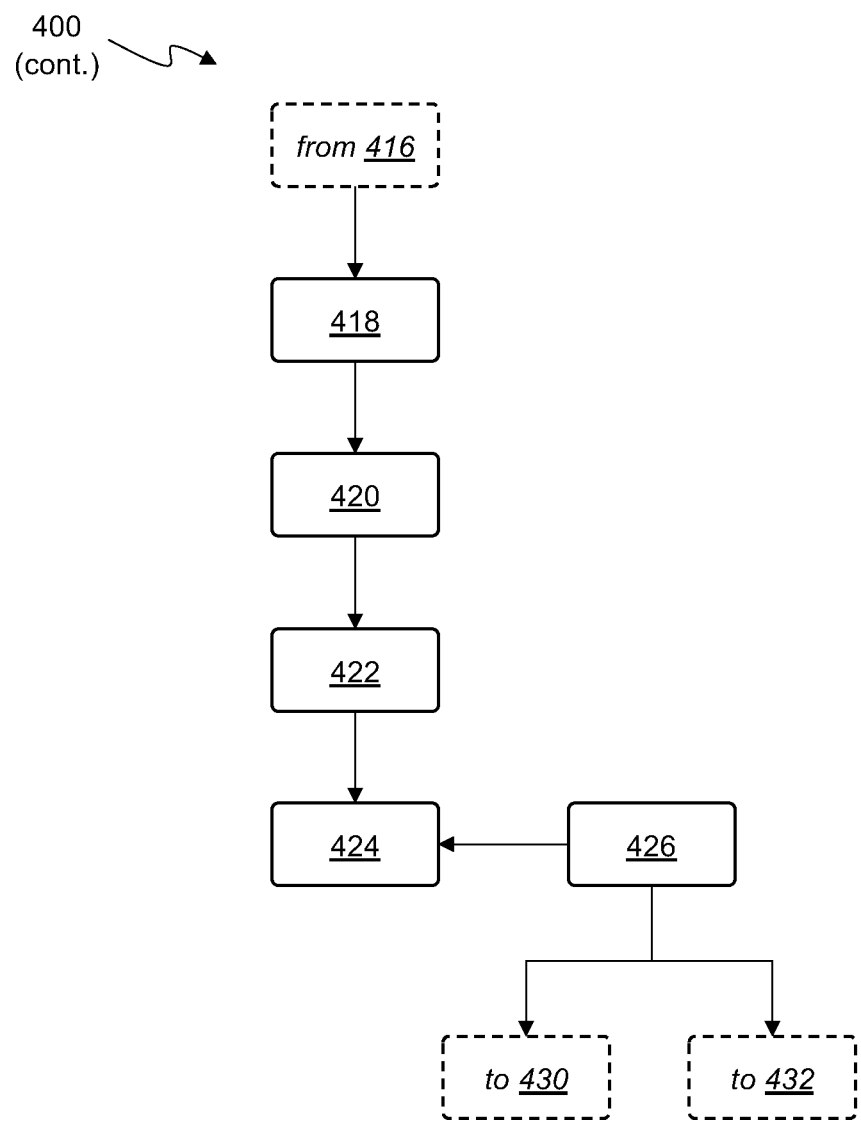
FIG. 4B illustrates a continuation of the method illustrated in FIG. 4A, according to an embodiment.

FIG. 4B illustrates a continuation of the method 400, according to an embodiment. The method 400 may include, at 418, receiving a request to confirm the user's identity. The method 400 may include, at 420, receiving confirmation the user wishes to see the results. The method 400 may include, at 422, receiving a selection of associated names or possible aliases. The method 400 may include, at 424, receiving an input selecting a block of search results records. The block may include two or more search results records. The method 400 may include, at 426, displaying an input field for the individual's private information. The method 400 may include verifying, using the individual's private information, that the search result records in the block match the individual's private information.

Figure 4C:
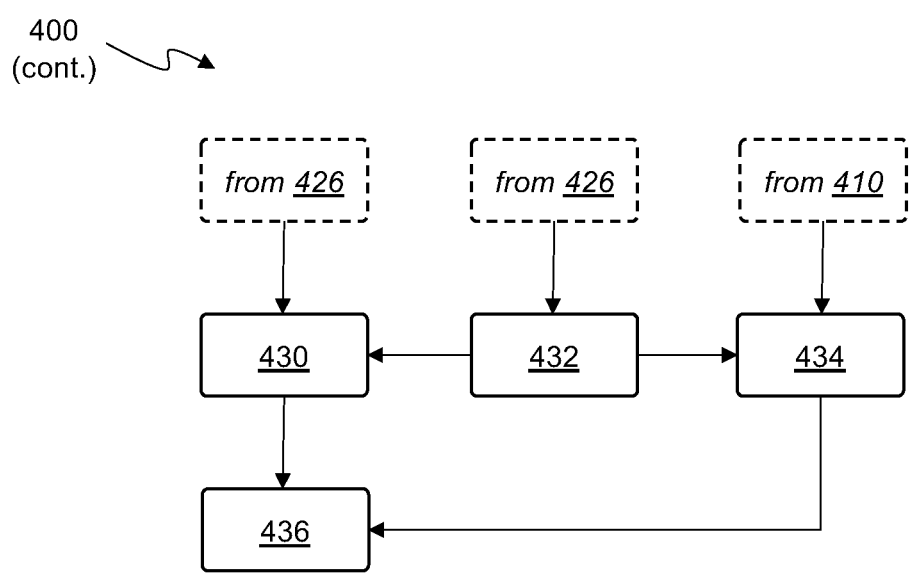
FIG. 4C illustrates a further continuation of the method illustrated in FIGS. 4A and 4B, according to an embodiment.

FIG. 4C illustrates a further continuation of the method 400, according to an embodiment. The method 400 may include, at 430, displaying an input field for an authenticator previously provided to the user/individual via the opt-out application. For example, the authenticator may be a confirmation code received, for example via an email, text, cell phone call, or landline call at 432 or a social media records request at 434. The method 400 may include, at 436, comparing the entered authenticator to an authenticator associated with the individual's private information. The method 400 may include, in response to the authenticators matching, displaying a block request confirmation number. The method 400 may include storing the block request confirmation number.

Figure 5A:
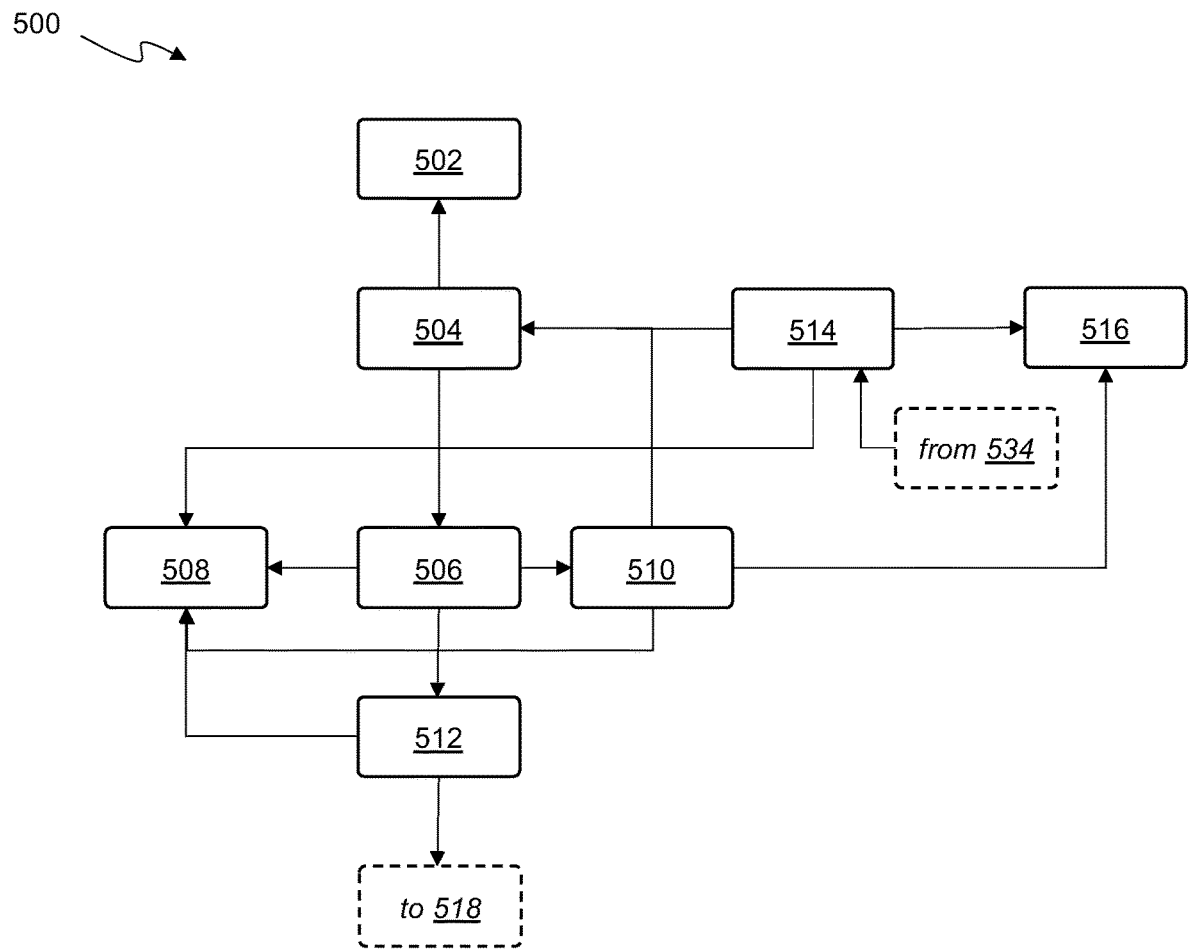
FIG. 5A illustrates a method of removing the individual's private information from a user application, according to an embodiment.

FIG. 5A illustrates a method 500 of removing the individual's private information from a user application, according to an embodiment. The method 500 may include various elements of the methods 300 and/or 400 in addition to those described below. For example, the method 500 may include displaying the opt-out application, receiving inputs (e.g., a selection of sites to search and/or private information about the individual), displaying search results, and so forth. The method 500 may include, at 504, opening the opt-out application (e.g., "DO NOT SELL MY NAME data app") on a computer. The opt-out application may be installed on a computer that runs an operating system 502 (e.g., a personal computer operating system such as Windows® or MacOS®, a mobile operating system such as iOS® or Android®, or via a web browser client that makes calls to a remote server). The method 500 may include, at 506, selecting a social media application 508. The method 500 may include, at 510, receiving an input selecting the manual input link and/or displaying information associated with the manual input link. The method 500 may include, at 512, displaying a prompt to accept cookies on one or more of the various sites that are searched. Such sites may require cookies to be accepted and/or enabled before accessing the site. The method 500 may include, at 514, providing a social media records request confirmation and requesting a confirmation code, which may be delivered at 516, for example, via an email, text, cell phone call, or landline call.

Figure 5B:
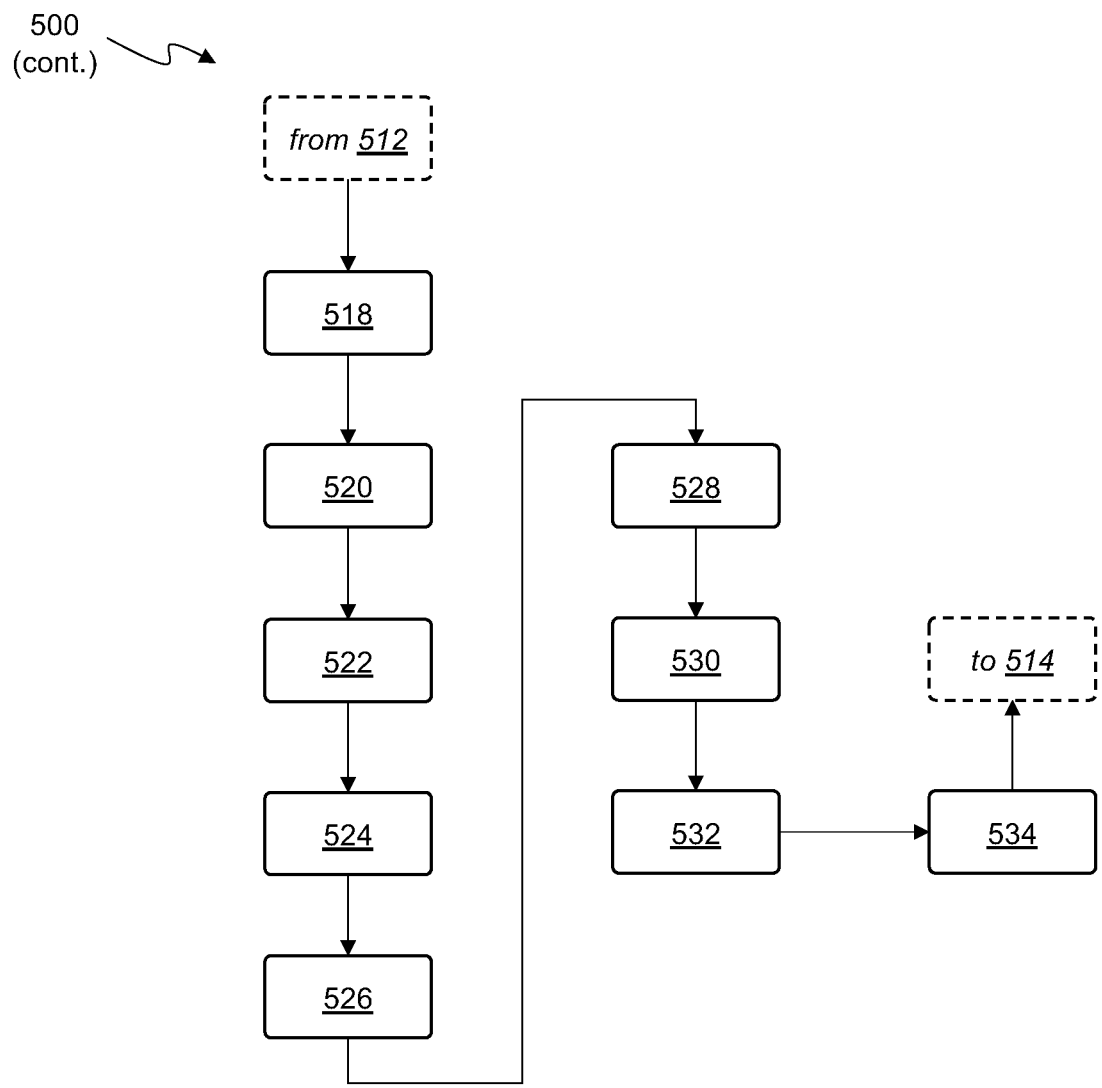
FIG. 5B illustrates a continuation of the method illustrated in FIG. 5A, according to an embodiment.

FIG. 5B illustrates a continuation of the method 500, according to an embodiment. The method 500 may include, at 518, confirming a user's agreement to search for results. The method 500 may include, at 520, searching for results of sites that have the individual's private information. The method 500 may include, at 522, displaying search results of sites that have the individual's private information. The method 500 may include, at 524, displaying a selectable link to remove the individual's private information from the site (i.e. the user application). The method 500 may include, at 526, compiling a report for one or more of the sites. The report may include information about what of the individual's private information was found, where it was found, how it is used by the site, and so forth. The method 500 may include, at 528, initiating a request to perform a removal for a particular result. The method 500 may include, at 530, returning to view additional results. The method 500 may include, at 532, initiating additional removal requests (e.g., statewide, nationwide). The method 500 may include, at 534, authenticating, using a confirmation code, a request to remove the individual's private information from the site.

Figure 6:
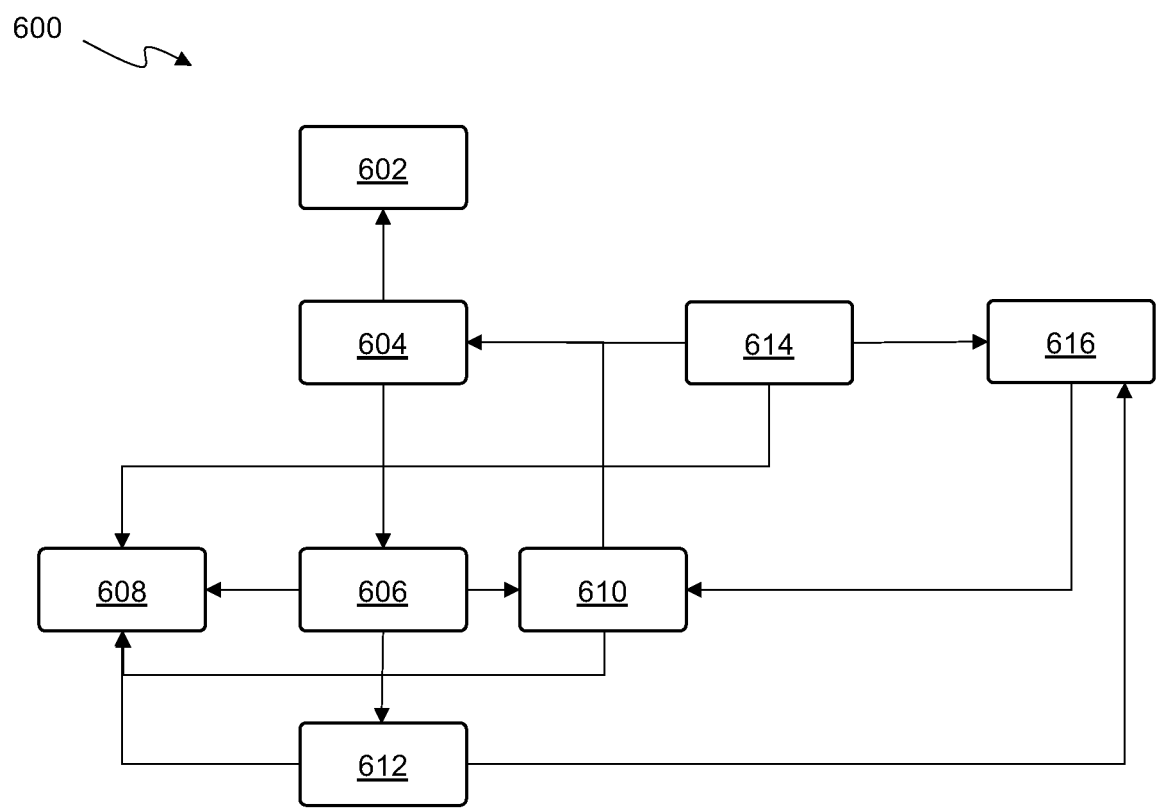
FIG. 6 illustrates a method of removing, via the opt-out application, an individual's personal information from the user application where the user application requests identity verification before removing the individual's personal information, according to an embodiment.

FIG. 6 illustrates a method 600 of removing, via the opt-out application, an individual's personal information from the user application where the user application requests identity verification before removing the individual's personal information, according to an embodiment. The method 600 may include various elements of the methods 300, 400, and/or 500 in addition to those described below. For example, the method 600 may include displaying the opt-out application, receiving inputs (e.g., a selection of sites to search and/or private information about the individual), displaying search results, and so forth. The method 600 may include, at 604, opening the opt-out application (e.g., "DO NOT SELL MY NAME data app") on a computer. The opt-out application may be installed on a computer that runs an operating system 602 (e.g., a personal computer operating system such as Windows® or MacOS®, a mobile operating system such as iOS® or Android®, or via a web browser client that makes calls to a remote server). The method 600 may include, at 606, selecting a social media application 608. The method 600 may include, at 610, selecting inputs automatically and inputting the user's personalized information. The method 600 may include, at 612, displaying an input field for an email address associated with a user application. The method 600 may include, at 612, displaying an input field for a URL address where the individual's private information is displayed. The method 600 may include, at 612, displaying an input field for specifying the individual's private information that the user would like to be removed from the user application. The method 600 may include displaying an input field for identifying information of the individual such as a government-issued identification card. The method 600 may include, compiling information input into the input fields and sending the information to an operator of the user application. The method 600 may include monitoring for a response from the user application as to whether the individual's private information was removed from the site. The method 600 may include, at 614, providing a social media records request confirmation and requesting a confirmation code, which may be delivered at 616, for example, via an email, text, cell phone call, or landline call.

Figure 7A:
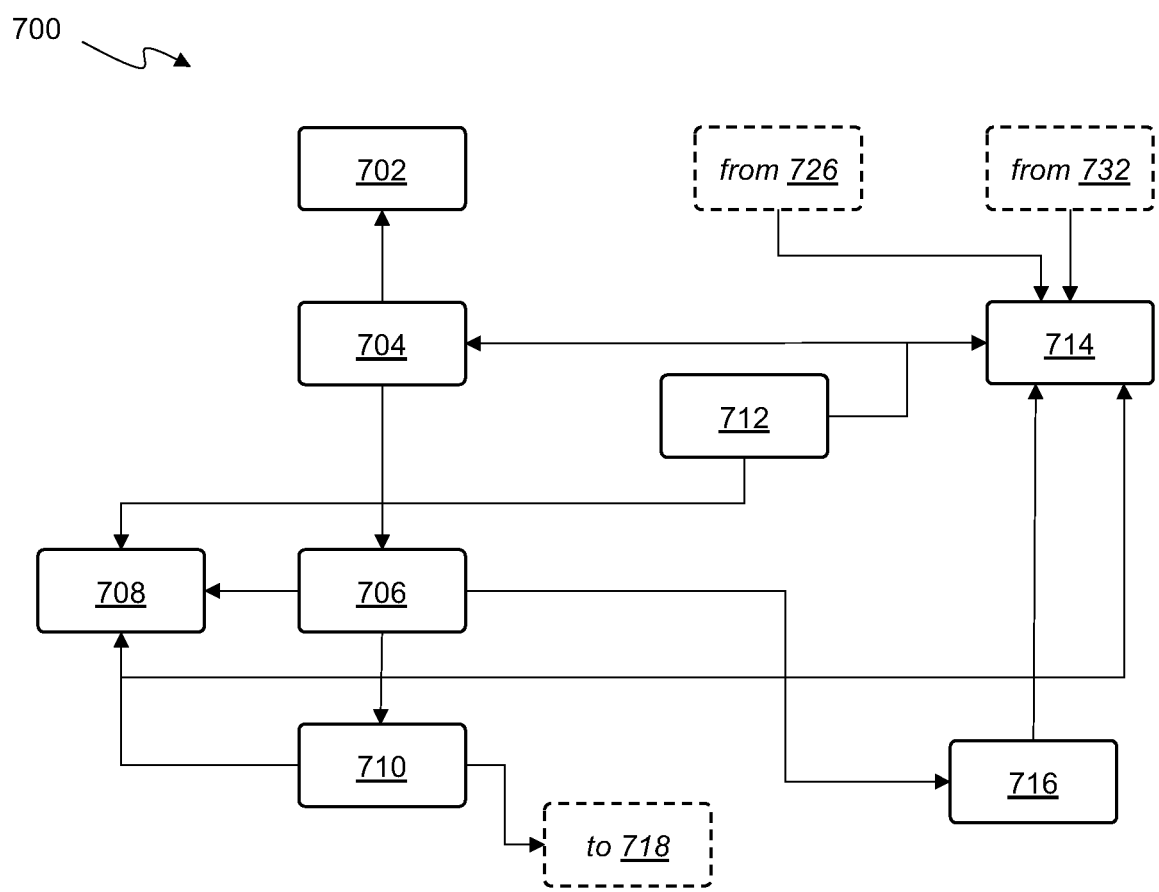
FIG. 7A illustrates a method of disassociating, via the opt-out application, the individual's personal information from information about a relative of the individual, according to an embodiment.

FIG. 7A illustrates a method 700 of disassociating, via the opt-out application, the individual's personal information from information about a relative of the individual, according to an embodiment. The method 700 may include various elements of the methods 300, 400, 500, and/or 600 in addition to those described below. The method 700 may include, at 704, opening the opt-out application (e.g., "DO NOT SELL MY NAME data app") on a computer. The opt-out application may be installed on a computer that runs an operating system 702 (e.g., a personal computer operating system such as Windows® or MacOS®, a mobile operating system such as iOS® or Android®, or via a web browser client that makes calls to a remote server). The method 700 may include, at 706, selecting a social media application 708. The method 700 may include, at 716, receiving an input selecting the manual input link and/or displaying information associated with the manual input link. The method 700 may include, at 712, providing a social media records request confirmation and requesting a confirmation code, which may be delivered at 714, for example, via an email, text, cell phone call, or landline call. For example, the method 700 may include displaying the opt-out application, receiving inputs (e.g., a selection of sites to search and/or private information about the individual), displaying search results, and so forth. The method 700 may include, at 710, displaying an input field for information about relatives of the individual. Such relatives may be living or deceased. The user application may store information that ties the relatives to the individual. The method 700 may include searching for the relatives' information, such as on an ancestry site. The method 700 may include, at 716, receiving an input selecting the manual input link and/or displaying information associated with the manual input link.

Figure 7B:
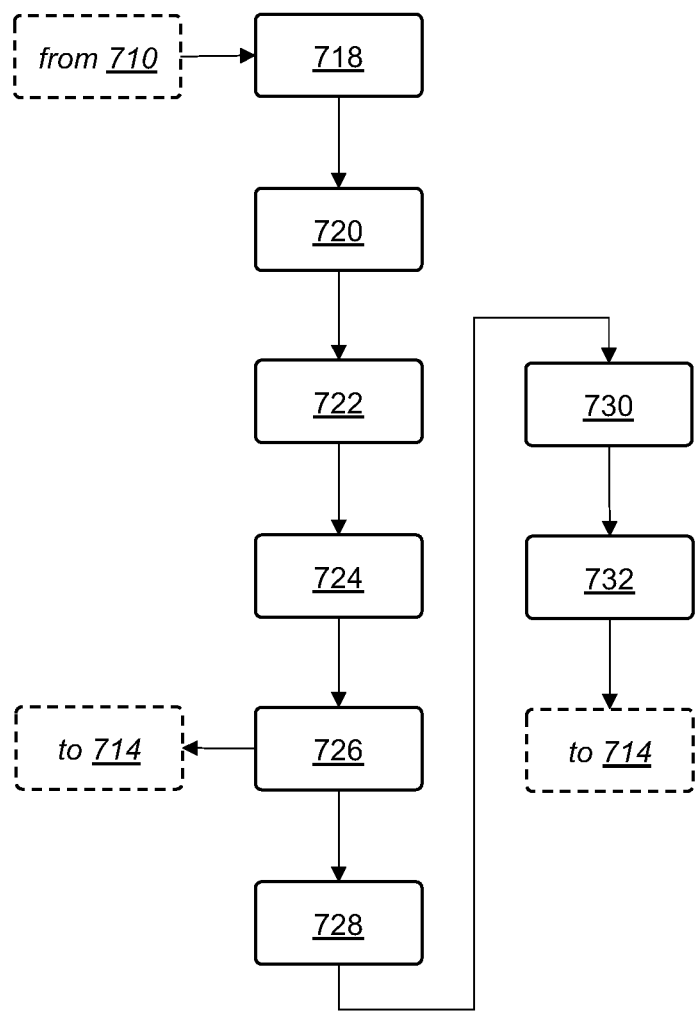
FIG. 7B illustrates a continuation of the method illustrated in FIG. 7A, according to an embodiment.

FIG. 7B illustrates a continuation of the method 700, according to an embodiment. The method 700 may include, at 718, displaying search results of the individual's relatives wherein the search results tie the individual's private information to a relative of the individual. The method 700 may include, at 720, scraping the ancestry site for information on how to access the site and remove the links between the individual's private information and the individual's relatives. The method 700 may include displaying the information to the user and/or displaying input fields for the information. The method 700 may include automatically inputting the information provided by the user into the user application. The method 700 may include searching the user application for opt-out information. The method 700 may include displaying, in the opt-out application, the opt-out information to the user. The method 700 may include, at 722, prompting a new user to subscribe to view the records found. The method 700 may include, at 724, collecting registration information from a new user, for example, a username and password. The method 700 may include, at 726, collecting a subscription choice from a new user, or offering a trial period. The method 700 may include, at 728, collecting payment information from a new user. The method 700 may include, at 730, navigating to the relevant opt-out page for submitting the opt-out application. The method 700 may include, at 732, receiving, in the opt-out application, an opt-out selection by the user. The method 700 may include using the opt-out information to opt the individual out of sharing the individual's private information.

Figure 8A:
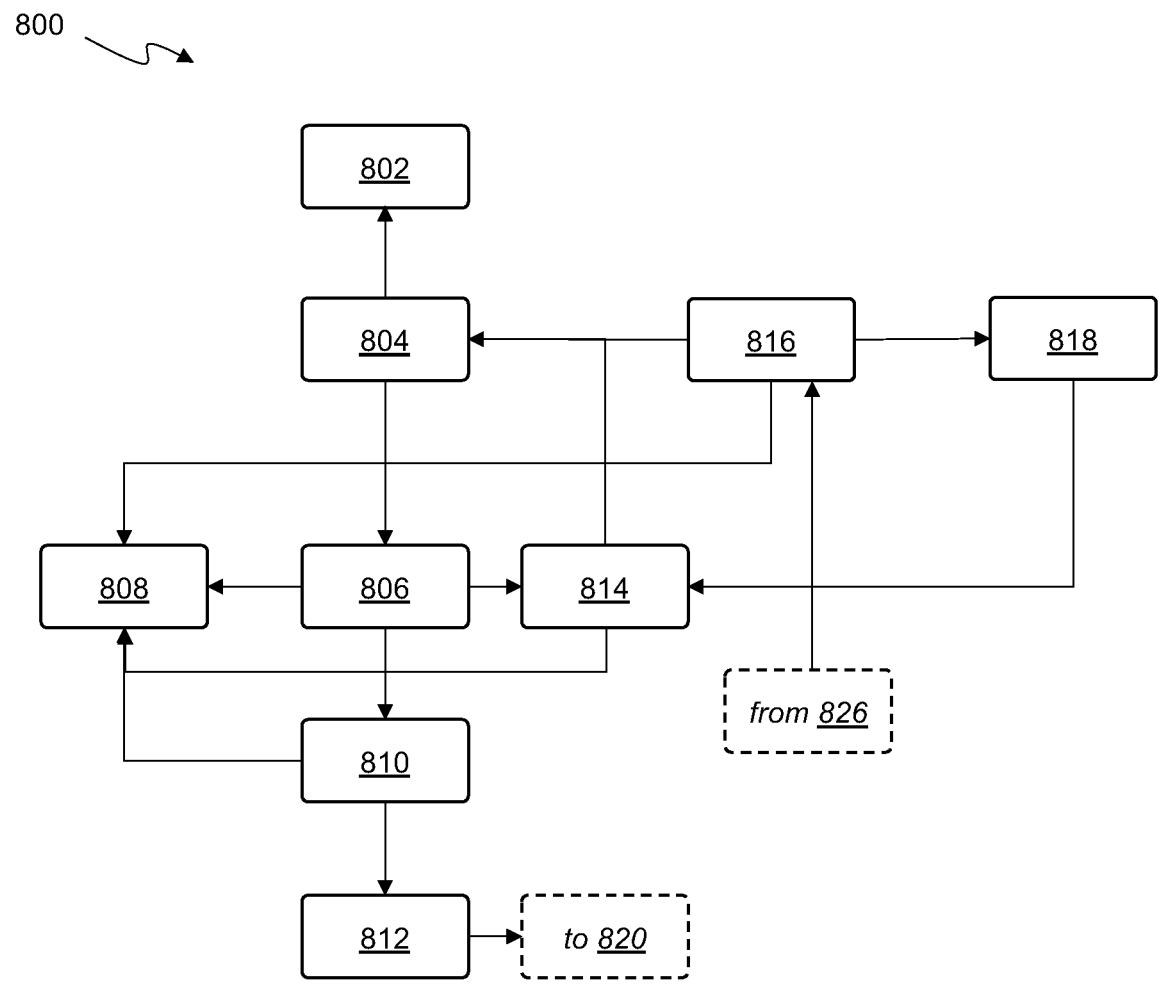
FIG. 8A illustrates a method of deleting, via the opt-out application, the individual's personal information from a background check application, according to an embodiment.

FIG. 8A illustrates a method 800 of deleting, via the opt-out application, the individual's personal information from a background check application, according to an embodiment. The method 800 may include various elements of the methods 300, 400, 500, 600 and/or 700 in addition to those described below. For example, the method 800 may include displaying the opt-out application, receiving inputs (e.g., a selection of sites to search and/or private information about the individual), displaying search results, and so forth. The method 800 may include, at 804, opening the opt-out application (e.g., "DO NOT SELL MY NAME data app") on a computer. The opt-out application may be installed on a computer that runs an operating system 802 (e.g., a personal computer operating system such as Windows® or MacOS®, a mobile operating system such as iOS® or Android®, or via a web browser client that makes calls to a remote server). The method 800 may include, at 806, selecting a social media application 808. The method 800 may include, at 814, receiving an input selecting the manual input link and/or displaying information associated with the manual input link. The method 800 may include, at 810, receiving a request to remove a record. The method 800 may include, at 812, obtaining, from a user application, a terms and conditions page, and/or an authentication challenge (e.g., a captcha challenge). The method 800 may include, at 812, displaying the terms and conditions and the authentication challenge. The method 800 may include, at 812, receiving an input accepting the terms and conditions and/or completing the authentication challenge. The method 800 may include, at 816, providing a social media records request confirmation and requesting a confirmation code, which may be delivered at 818, for example, via an email, text, cell phone call, or landline call.

Figure 8B:
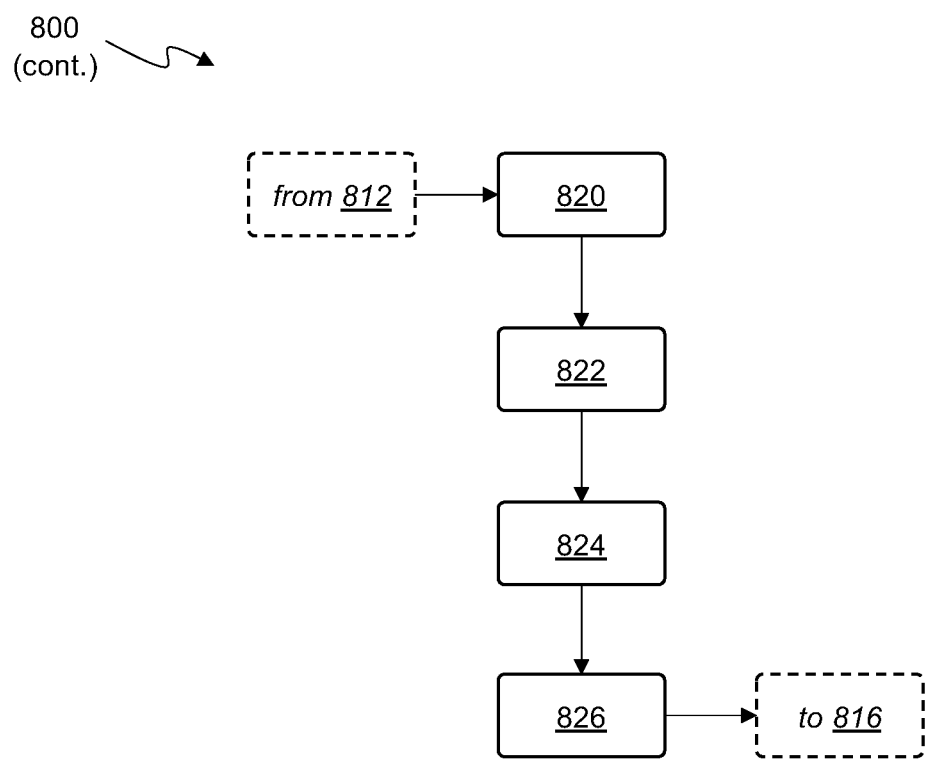
FIG. 8B illustrates a continuation of the method illustrated in FIG. 8A, according to an embodiment.

FIG. 8B illustrates a continuation of the method 800, according to an embodiment. The method 800 may include retrieving the individual's private information from the user application and/or displaying the private information. The method 800 may include displaying an option to select specific elements of the individual's private information. The method 800 may include displaying a button to request the selected elements be removed from the user application. The method 800 may include receiving an input selecting the button to remove the information. The method 800 may include transmitting the request to the user application. The method 800 may include, at 820, prompting a user to search for a record they seek to remove and providing full information for the record. The method 800 may include, at 822, displaying the full information for the record. The method 800 may include, at 824, receiving input from a user to remove the record. The user may be required to be viewing the full information view of the record. The method 800 may include, at 826, sending a confirmation link via email to the user's email address, whereby the user may click the link to confirm removal of the record.

Figure 9:
FIG. 9 illustrates an example of a personal information removal process for a background check application, according to an embodiment.

FIG. 9 illustrates an example of a personal information removal process for a background check application, according to an embodiment. Particularly, FIG. 9 illustrates a sample instruction set 900 for a user to remove personal information.

Figure 10A:
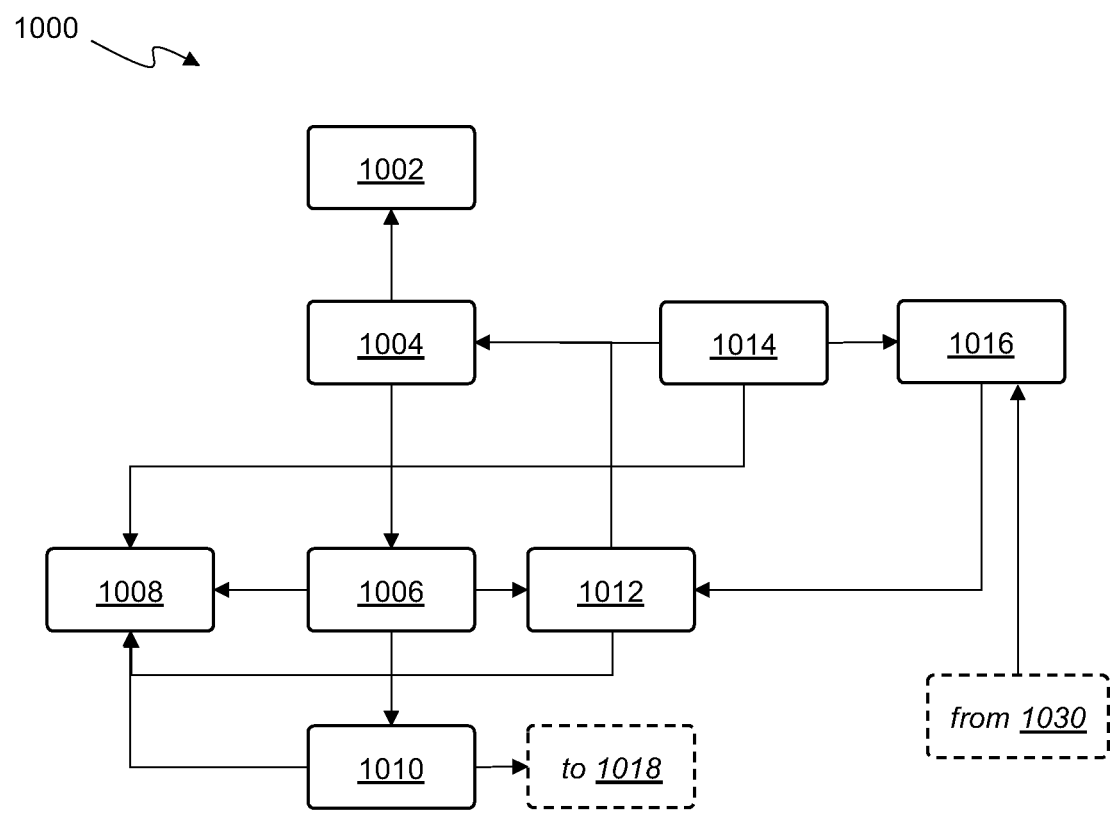
FIG. 10A illustrates another method of deleting, via the opt-out application, the individual's personal information from a background check application, according to an embodiment.

FIG. 10A illustrates another method 1000 of deleting, via the opt-out application, the individual's personal information from a background check application, according to an embodiment. The method 1000 may include various elements of the methods 300, 400, 500, 600, 700, 800, and/or 900 in addition to those described below. For example, the method 1000 may include displaying the opt-out application, receiving inputs (e.g., a selection of sites to search and/or private information about the individual), displaying search results, and so forth. The method 1000 may include, at 1004, opening the opt-out application (e.g., "DO NOT SELL MY NAME data app") on a computer. The opt-out application may be installed on a computer that runs an operating system 1002 (e.g., a personal computer operating system such as Windows® or MacOS®, a mobile operating system such as iOS® or Android®, or via a web browser client that makes calls to a remote server). The method 1000 may include, at 1006, selecting a social media application 1008. The method 1000 may include, at 1012, receiving an input selecting the manual input link and/or displaying information associated with the manual input link. The method 1000 may include, at 1014, providing a social media records request confirmation and requesting a confirmation code, which may be delivered at 1016, for example, via an email, text, cell phone call, or landline call. The method 1000 may include, at 1010, personal information may be input and an instruction to find personal information may be received.

Figure 10B:
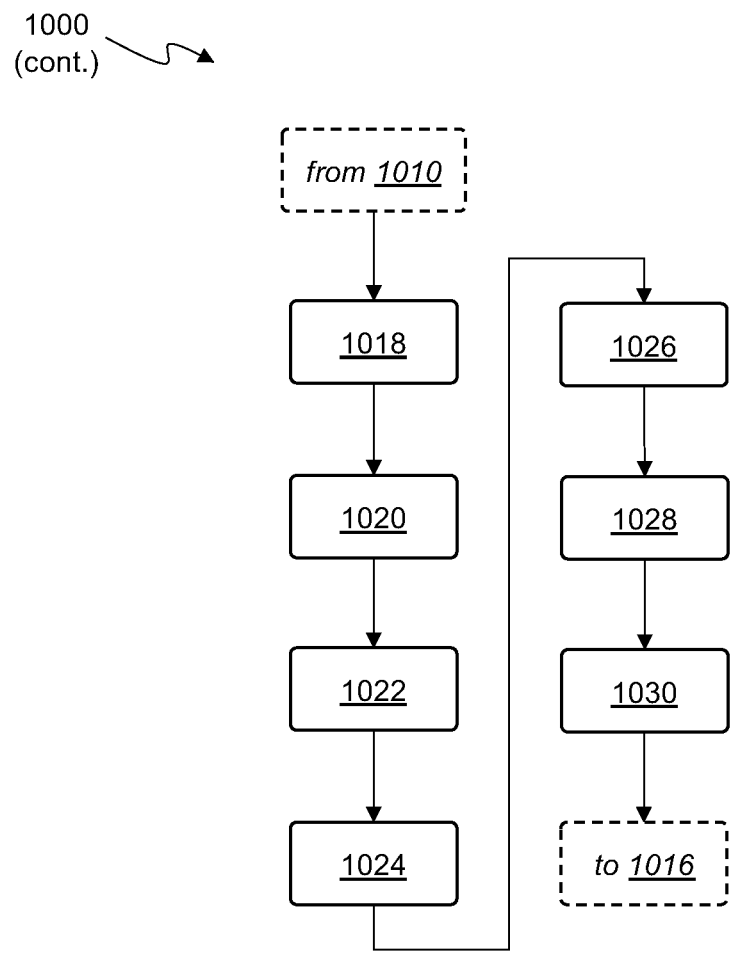
FIG. 10B illustrates a continuation of the method illustrated in FIG. 10A, according to an embodiment.

FIG. 10B illustrates a continuation of the method 1000, according to an embodiment. The method 1000 may include, at 1018, finding fields for filling out search information and filling the found fields. The method 1000 may include, at 1020, displaying the user's full profile. The method 1000 may include, at 1022, opening a report associated with the user's profile. The method 1000 may include, at 1024, receiving an instruction from the user to opt-out. The method 1000 may include, at 1026, confirming whether the user has been a customer of a given website hosting private information. The method 1000 may include, at 1028, a selection of a record and an instruction to remove the record. The method 1000 may include, at 1030, providing an emailed confirmation code to the user, which may be navigated to by the user to complete their removal request.

Figure 11A:
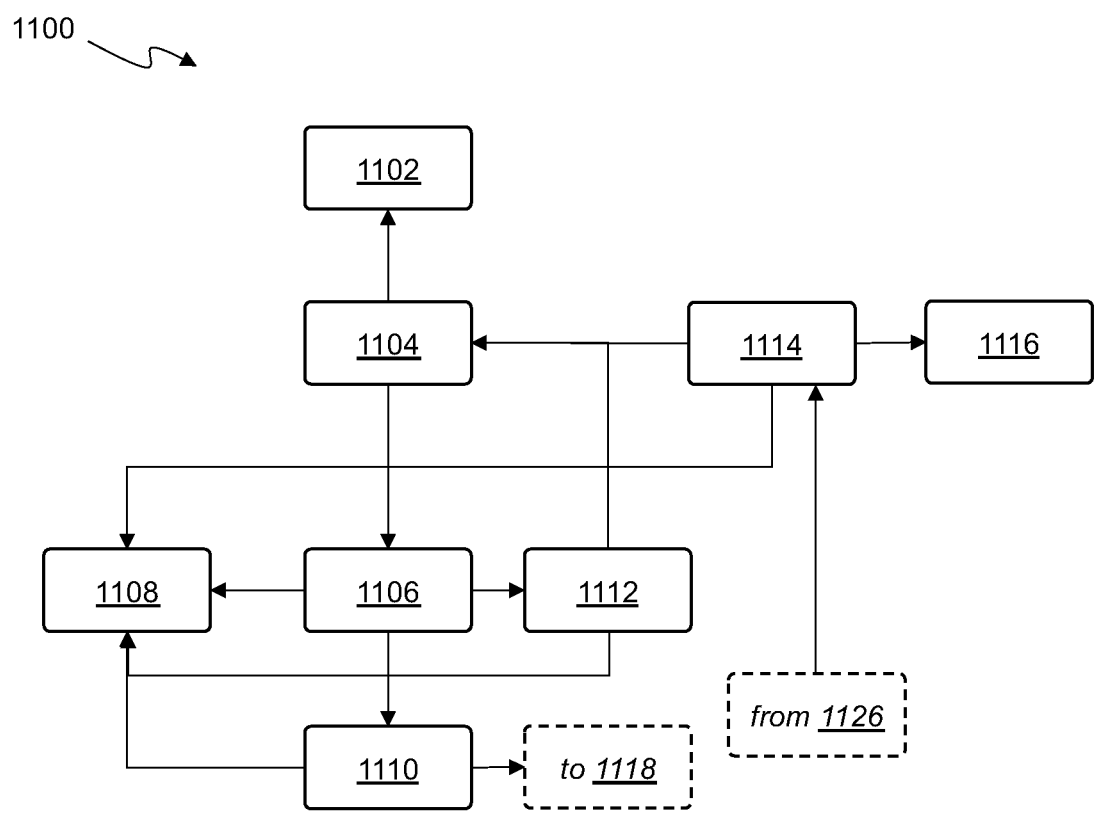
FIG. 11A illustrates a method of opting out, via the opt-out application, of a social media application's data-sharing practices, according to an embodiment.

FIG. 11A illustrates a method 1100 of opting out, via the opt-out application, of a social media application's data-sharing practices, according to an embodiment. The method 1100 may include various elements of the methods 300, 400, 500, 600, 700, 800, 900, and/or 1000 in addition to those described below. For example, the method 1100 may include displaying the opt-out application, receiving inputs (e.g., a selection of sites to search and/or private information about the individual), displaying search results, and so forth. The method 1100 may include displaying an input field for a person associated with the individual where the person may have put private information about the individual online. The person may be a friend, family member, co-worker, and so forth. The method 1100 may include searching for online information linking the person and the individual's private information. The method 1100 may include displaying the search results. The method 1100 may include, at 1104, opening the opt-out application (e.g., "DO NOT SELL MY NAME data app") on a computer. The opt-out application may be installed on a computer that runs an operating system 1102 (e.g., a personal computer operating system such as Windows® or MacOS®, a mobile operating system such as iOS® or Android®, or via a web browser client that makes calls to a remote server). The method 1100 may include, at 1106, selecting a social media application 1108. The method 1100 may include, at 1110, receiving an input of personal information to define who the user is searching for. The method 1100 may include, at 1112, selecting inputs automatically and inputting the person-of-interest's personalized information. The method 1100 may include, at 1114, providing a social media records request confirmation and requesting a confirmation code, which may be delivered at 1116, for example, via an email, text, cell phone call, or landline call.

Figure 11B:
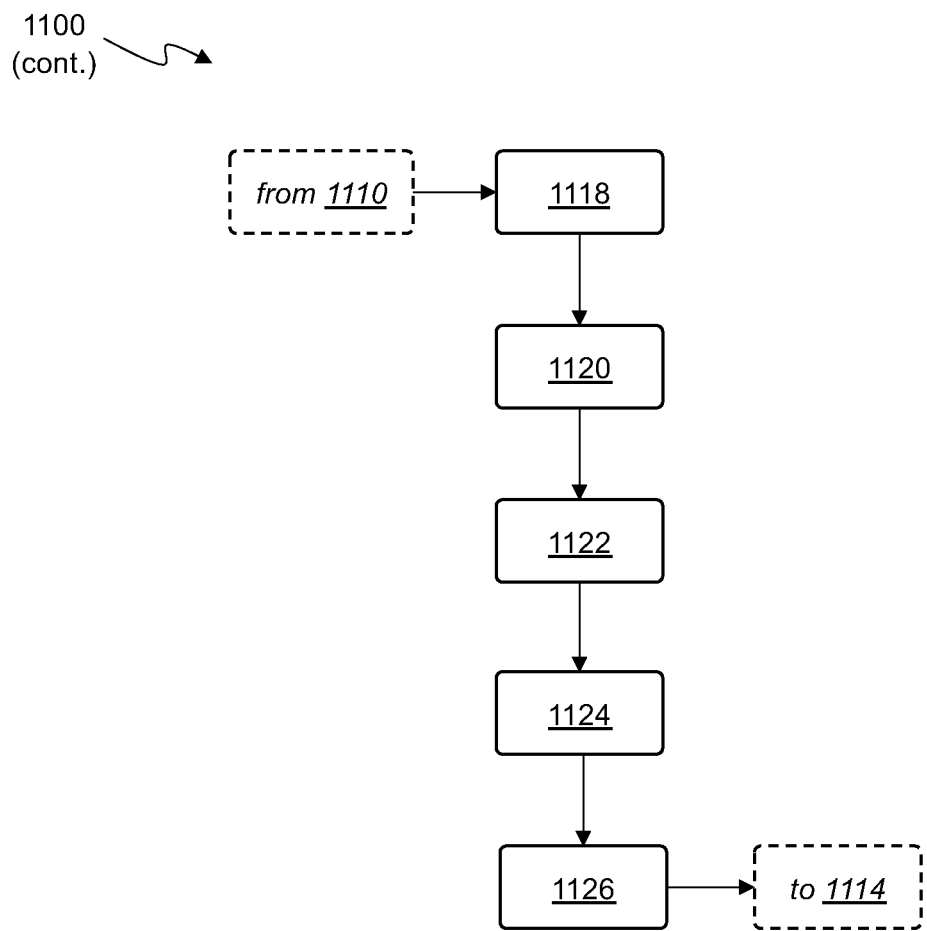
FIG. 11B illustrates a continuation of the method illustrated in FIG. 11A, according to an embodiment.

FIG. 11B illustrates a continuation of the method 1100, according to an embodiment. The method 1100 may include displaying a link to the person's profile. The method 1100 may include receiving a request to display the person's profile on the user application. The method 1100 may include displaying the person's profile in the opt-out application. The method 1100 may include displaying a button that allows the user to remove the individual's private information from the person's profile. The method 1100 may include receiving a request to remove the individual's private information from the person's profile. The method 1100 may include sending the request via the opt-out application to the person in the user application. The method 1100 may include, at 1118, displaying the person-of-interest's full profile. The method 1100 may include, at 1120, receiving inputs of the person-of-interest's personal information and a request to search. The method 1100 may include, at 1122, searching for results where the name in the result matches that of the person-of-interest. The method 1100 may include, at 1124, receiving an opt-out request for the person-of-interest for a given result and an input of the user's email address. The method 1100 may include, at 1126, receiving a verification of an opt-out request related to the person-of-interest by the user navigating to the verification link sent to the user's email address.

Figure 12:
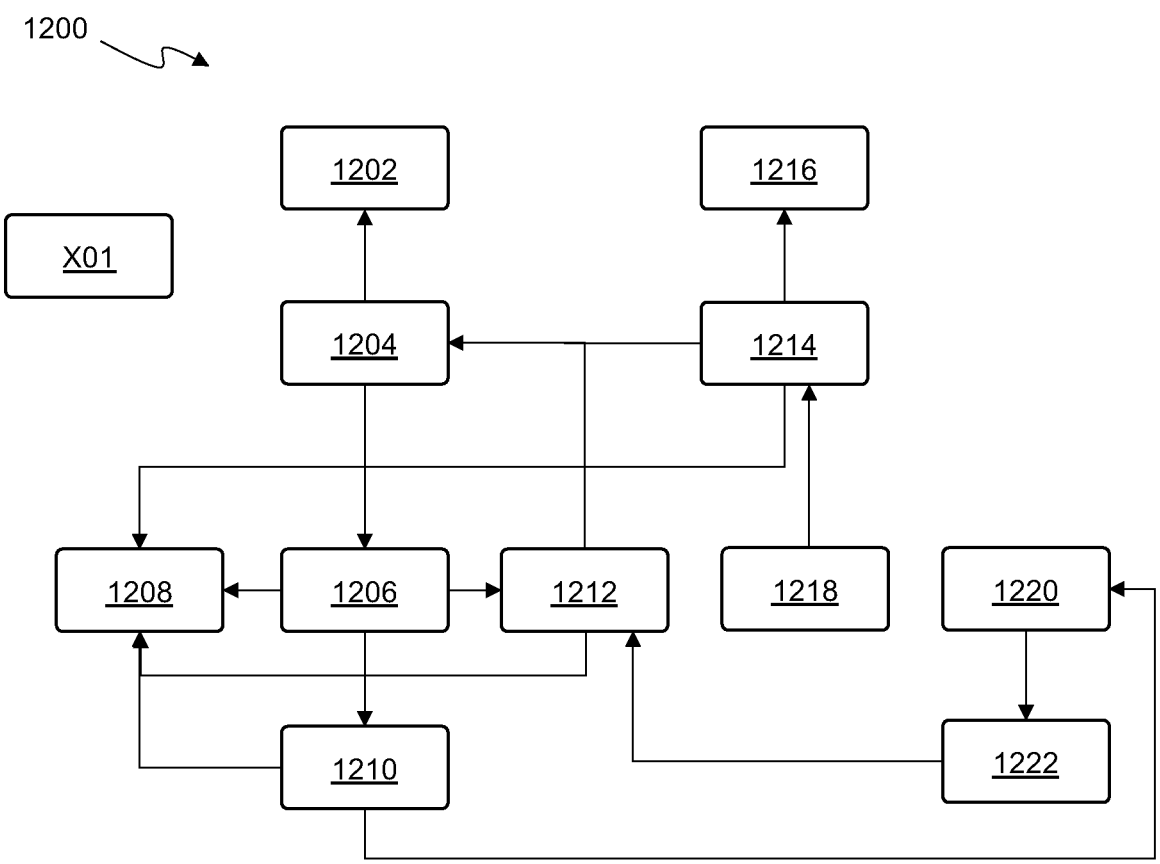
FIG. 12 illustrates a method of opting out, via the opt-out application, of another background check application's data-sharing practices where the background check application asks questions to verify the individual's identity, according to an embodiment.

FIG. 12 illustrates a method 1200 of opting out, via the opt-out application, of another background check application's data-sharing practices where the background check application asks questions to verify the individual's identity, according to an embodiment. The method 1200 may include various elements of the methods 300, 400, 500, 600, 700, 800, 900, 1000, and/or 1100 in addition to those described below. For example, the method 1200 may include displaying the opt-out application, receiving inputs (e.g., a selection of sites to search and/or private information about the individual), displaying search results, and so forth.

The method 1200 may include, at 1204, opening the opt-out application (e.g., "DO NOT SELL MY NAME data app") on a computer. The opt-out application may be installed on a computer that runs an operating system 1202 (e.g., a personal computer operating system such as Windows® or MacOS®, a mobile operating system such as iOS® or Android®, or via a web browser client that makes calls to a remote server). The method 1200 may include, at 1206, selecting a social media application 1208. The method 1200 may include, at 1212, receiving an input selecting the manual input link and/or displaying information associated with the manual input link. The method 1200 may include, at 1214, providing a social media records request confirmation and requesting a confirmation code, which may be delivered at 1216, for example, via an email, text, cell phone call, or landline call. The method 1200 may include, at 1218, requiring the user to click on a verification link to confirm their desire to opt-out. The method 1200 may include, at 1212, receiving an input selecting the manual input link and/or displaying information associated with the manual input link. The method 1200 may include, at 1210, receiving an input of personal information to define who the user is searching for. The method 1200 may include, at 1220, receiving a selection of a record to remove. The method 1200 may include, at 1222, receiving inputs of answers to challenge questions to ensure the user is validly seeking to remove the person-of-interest's information.

Figure 13:
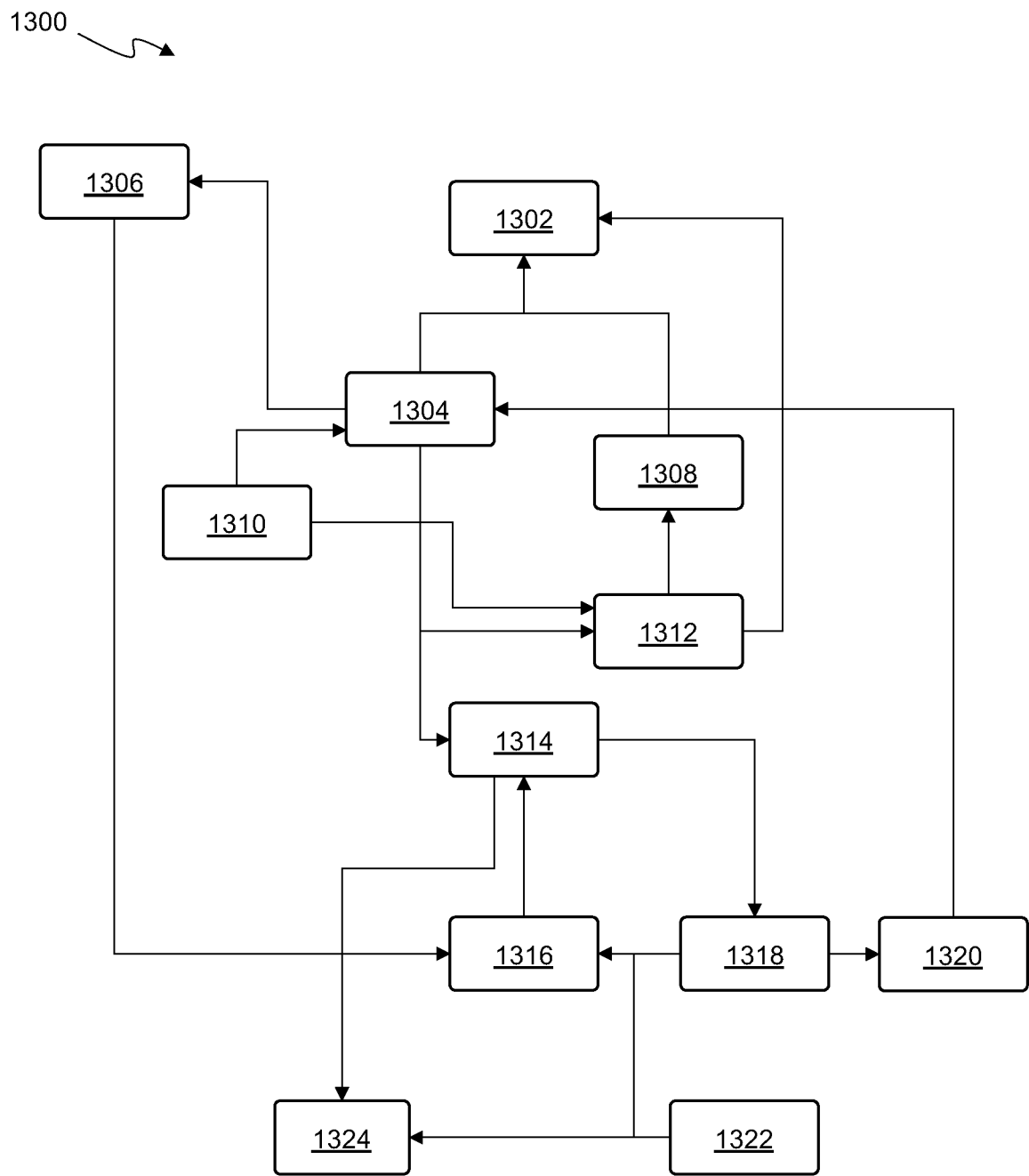
FIG. 13 illustrates a method of removing the individual's personal information from the dark web via the opt-out application, according to an embodiment.

FIG. 13 illustrates a method 1300 of removing the individual's personal information from the dark web via the opt-out application, according to an embodiment. The method 1300 may include various elements of the methods 300, 400, 500, 600, 700, 800, 900, 1000, 1100, and/or 1200 in addition to those described below. For example, the method 1300 may include displaying the opt-out application, receiving inputs (e.g., a selection of sites to search and/or private information about the individual), displaying search results, and so forth.

The method 1300 may include, at 1304, opening the opt-out application (e.g., "DO NOT SELL MY NAME data app") on a computer. The opt-out application may be installed on a computer that runs an operating system 1302 (e.g., a personal computer operating system such as Windows® or MacOS®, a mobile operating system such as iOS® or Android®, or via a web browser client that makes calls to a remote server). The method 1300 may include, at 1308, setting a default search engine that does not track the user's web searching. The method 1300 may include, at 1306, receiving personal anonymous contact information to receive or send printed-out letters (e.g., email addresses, phone numbers, fax machines, mailboxes, or text numbers). The method 1300 may include, at 1310, automatically providing personal information (e.g., first name, middle name, last name, social security number, personal identification number, driver's license with blocked-out signature, photo, and ID number). The method 1300 may include, at 1314, providing for a search engine. The method 1300 may include, at 1316, opening a single sign on portal. The method 1300 may include, at 1318, accessing a social media's server to use received information to opt-out of information sales upon execution of a process for removal, as well as deactivating or activating accounts. The method 1300 may include, at 1320, opting out of personal accounts and websites. The method 1300 may include, at 1322, accessing the dark web to find and remove personal information. The method 1300 may include, at 1324, accessing social media websites, background check websites, or other information sharing websites to find and remove personal information.

Embodiments may implement machine learning, a type of artificial intelligence (AI) that provides computers with an ability to learn how to process data without being explicitly programmed. Machine learning focuses on the development of computer programs that can teach themselves to grow and change when exposed to new data. Machine learning explores the study and construction of algorithms that can learn from and make predictions based on data. Such algorithms may overcome following strictly static program instructions by making data-driven predictions or decisions, through building a model from sample inputs.

Machine learning may refer to a variety of AI software algorithms, which may be used to perform supervised learning, unsupervised learning, reinforcement learning, deep learning, or any combination thereof. A variety of different machine learning algorithms may be employed in embodiments. Examples of machine learning algorithms may include, inter alia, artificial neural network algorithms, Gaussian process regression algorithms, fuzzy logic-based algorithms, or decision tree algorithms.

In some embodiments, more than one machine learning algorithm may be employed. For example, automated classification may be implemented using one type of machine learning algorithm, and adaptive real-time process control may be implemented using a different type of machine learning algorithm. In some embodiments, hybrid machine learning algorithms including features and properties drawn from two, three, four, five, or more different types of machine learning algorithms may be employed in embodiments.

Supervised learning algorithms may use labeled training data to infer a relationship between one or more identifiable aspects of a given entity and a classification of the entity according to a specified set of criteria or to infer a relationship between input process control parameters and desired outcomes. The training data may include paired training examples. For example, each training data example may include aspects identified for a given entity and the resultant classification of the given entity. As a further example, each training data example may include process control parameters used in a process and a known outcome of the process.

Unsupervised learning algorithms may be used to draw inferences from training data including entity data not paired with labeled entity classification data, or input process control parameter data not paired with labeled process outcomes. An example unsupervised learning algorithm is cluster analysis, which may be used for exploratory data analysis to find hidden patterns or groupings in process data.

Semi-supervised learning algorithms may use both labeled and unlabeled object classification or process data for training. Semi-supervised learning algorithms may typically use a small amount of labeled data with a large amount of unlabeled data.

Reinforcement learning algorithms may be used, for example, to optimize a process (e.g., steps or actions of the process) to maximize a process reward function or minimize a process loss function. In machine learning environments, reinforcement learning algorithms may be formulated as Markov decision processes. Reward functions or loss functions, which may also be referred to as cost functions or error functions, may map values of one or more process variables and/or outcomes to a real number that represents a reward or cost, respectively, associated with a given process outcome or event. Examples of process parameters and process outcomes include, inter alia, process throughput, process yield, production quality, or production cost. In some cases, the definition of the reward or loss function to be maximized or minimized, respectively, may depend on the choice of machine learning algorithm used to run the process control method, or vice versa. For example, if an objective is to maximize a total reward/value function, a reinforcement learning algorithm may be chosen. If the objective is to minimize a mean squared error loss function, a decision tree regression algorithm or linear regression algorithm may be chosen. In general, the machine learning algorithm used to run the process control method will seek to optimize the reward function or minimize the loss function by identifying the current state of the process; comparing the current state to the reference state, which may be a target intermediate or final state; and adjusting one or more process control parameters to minimize a difference between the two states. This adjustment may include reference to past learning provided by a training data set. Reinforcement learning algorithms differ from supervised learning algorithms in that correct training data input/output pairs are not presented, nor are sub-optimal actions explicitly corrected. Implementations of these algorithms tend to focus on real-time performance by finding a balance between exploration of possible outcomes based on updated input data and exploitation of past training.

Deep learning, which may also be known as deep structured learning, hierarchical learning, or deep machine learning, may be based on a set of algorithms that attempt to model high level abstractions in data. Deep learning algorithms may be inspired by the structure and function of the human brain and is part of a broader family of machine learning methods based on learning representations of data. Rooted in neural network technology, deep learning may involve a probabilistic graph model having many neuron layers, commonly known as a deep architecture. Deep learning technology may process information such as, inter alia, image, text, or sound information in a hierarchical manner. An observation (e.g., a feature to be extracted for reference) can be represented in many ways including, for example, a vector of intensity values, a set of edges, regions of shape, or in another abstract manner. Some representations may simplify the learning task (e.g., face recognition or facial expression recognition). Deep learning can provide efficient algorithms for unsupervised or semi-supervised feature learning and hierarchical feature extraction. Embodiments employing deep learning can further benefit from the advantage of deep learning concepts in solving a normally intractable representation inversion problem.

A deep learning module may be configured as a neural network. The deep learning module may further be a deep neural network with a set of weights that model the world based on training using training data. Neural networks can be understood to implement a computational approach—based on a relatively large collection of neural units—to loosely model the way a human brain solves problems with large clusters of biological neurons connected by axons. Each neural unit may be connected to one or more others, and links can be enforcing or inhibitory in their effect on the activation state of connected neural units. These systems may be self-learning and trained rather than explicitly programmed. Neural network systems excel in areas where a solution or feature detection is difficult to express in a traditional computer program.

An example of a deep learning algorithm may be an artificial neural network (ANN). Large ANNs including many layers may be used, for example, to map entity data to entity classification decisions or to map input process control parameters to desired process outcomes. ANNs will be discussed in further detail below.

Neural networks typically include multiple layers, and the signal path may traverse from front to back. The goal of neural networks may be to solve problems in a similar manner to the human brain, although several neural networks may be much more abstract. In a simple example of a neural network, there may be two layers (i.e., sets) of neurons: an input layer that receives an input signal and an output layer that sends an output signal. When the input layer receives an input, it may pass a modified version of the input to the next layer. In a deep network, there may be many layers between the input layer and output layer, allowing the algorithm to use multiple processing layers, which may include multiple linear and non-linear transformations. Modern neural networks typically work with a few thousand to a few million neural units and millions of connections. Neural networks may have various suitable architectures and/or configurations known in the art.

There are many variants of neural networks with deep architecture depending on the probability specification and network architecture, including, inter alia, deep belief networks (DBN), restricted Boltzmann machines (RBM), random forests, and autoencoders.

Implementations of neural networks may vary depending on the size of input data, the number of features to be analyzed, and the nature of the problem. Other layers may be included in the deep learning module besides the neural networks disclosed herein.

Another type of deep neural network may be a convolutional neural network (CNN), which can be used for analysis of an entity or process. CNNs are commonly composed of layers of different types: convolution, pooling, upscaling, and fully connected layers. In some cases, an activation function such as rectified linear unit (ReLU) may be used in some of the layers. In a CNN architecture, there can be one or more layers for each type of operation performed. A CNN architecture may include any number of layers in total, and any number of layers for the different types of operations performed. The simplest CNN architecture starts with an input layer followed by a sequence of convolutional layers and pooling layers (e.g., layers otherwise configured for reducing the dimensionality of the feature map generated by the one or more convolutional layers while retaining the most important features, for example, max pooling layers) and ends with fully connected layers (e.g., a layer in which each of the nodes is connected to each of the nodes in the previous layer). Each convolution layer may include a plurality of parameters used for performing the convolution operations. Each convolution layer may also include one or more filters, which in turn may include one or more weighting factors or other adjustable parameters. In some instances, the parameters may include biases (e.g., parameters that permit an activation function to be shifted). In some cases, the convolutional layers may be followed by an ReLU activation function layer. Other activation functions can also be used, for example, inter alia, saturating hyperbolic tangent, identity, binary step, logistic, arctan, softsign, parametric rectified linear unit, exponential linear unit, softPlus, bent identity, softExponential, Sinusoid, Sinc, Gaussian, or sigmoid functions. The convolutional, pooling and ReLU layers may function as learnable feature extractors, while the fully connected layers may function as machine learning classifiers. As with other artificial neural networks, the convolutional layers and fully connected layers of CNN architectures may include various computational parameters, for example, weights, bias values, and threshold values, which may be trained in a training phase.

Another type of deep neural network may be a visual geometry group (VGG) network. For example, VGG networks may be created by increasing the number of convolutional layers while fixing other parameters of the architecture. Adding convolutional layers to increase depth may be made possible by using substantially small convolutional filters in all of the layers. VGG networks may also include convolutional layers followed by fully connected layers.

Another type of deep neural network may be a deep residual network. Like some other networks described herein, a deep residual network may include convolutional layers followed by fully connected layers, which may be, in combination, configured and trained for feature property extraction. A deep residual network's layers may be configured to learn residual functions with reference to layer inputs, instead of learning unreferenced functions. Instead of relying on a direct fit of few stacked layers to a desired underlying mapping, a deep residual network's layers may be explicitly allowed to fit a residual mapping, which may be realized by feedforward neural networks having shortcut connections (i.e., connections that skip one or more layers). A deep residual network may be created by inserting shortcut connections into a plain neural network structure including convolutional layers, thereby modifying the plain neural network into a residual learning network.

In some embodiments, the machine learning module may include a support vector machine (SVM), an artificial neural network (ANN), a decision tree-based expert learning system, an autoencoder, a clustering machine learning algorithm, or a nearest neighbor (e.g., kNN) machine learning algorithm, or combinations thereof, some of which will be described in further detail below.

Support vector machines (SVMs) may be supervised learning algorithms used for classification and regression analysis of entity classification data or process control. Given a set of training data examples (e.g., entity or process data), each marked as belonging to a category, an SVM training algorithm may build a model that assigns new examples (e.g., data from a new entity or process) to a given category.

Figure 14:
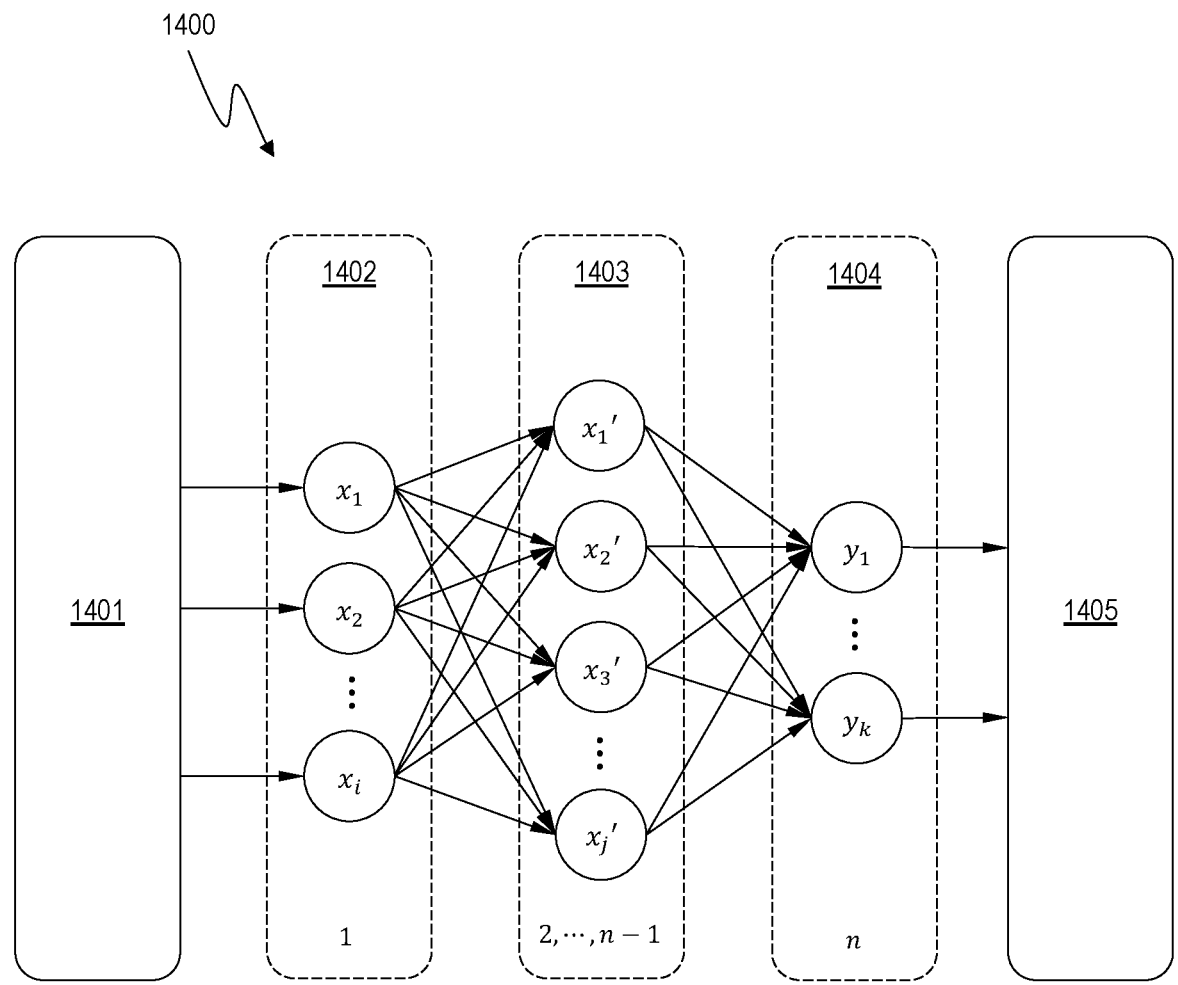
FIG. 14 illustrates an artificial neural network (ANN), according to an embodiment.

FIG. 14 illustrates an artificial neural network (ANN) 1400, according to an embodiment. The ANN 1400 may be used for, inter alia, classification or process control optimization according to various embodiments.

The ANN 14100 may include any type of neural network module, such as, inter alia, a feedforward neural network, radial basis function network, recurrent neural network, or convolutional neural network.

In embodiments implementing the ANN 1400 for entity classification, the ANN 1400 may be employed to map entity data to entity classification data. In embodiments implementing the ANN 1400 for process optimization, the ANN 1400 may be employed to determine an optimal set or sequence of process control parameter settings for adaptive control of a process in real-time based on a stream of process monitoring data and/or entity classification data provided by, for example, observation or from one or more sensors. The ANN 1400 may include an untrained ANN, a trained ANN, pre-trained ANN, a continuously updated ANN (e.g., an ANN utilizing training data that is continuously updated with real time classification data or process control and monitoring data from a single local system, from a plurality of local systems, or from a plurality of geographically distributed systems).

The ANN 1400 may include interconnected nodes (e.g., $x_1$-$x_i$, $x_1'$-$x_j'$, and $y_1$-$y_k$) organized into n layers of nodes, where $x_1$-$x_i$ represents a group of i nodes in a first layer 1402 (e.g., layer 1), $x_1'$-$x_j'$ represents a group of j nodes in a hidden layer 1403 (e.g., layer(s) 2 through n−1), and $y_1$-$y_k$ represents a group of k nodes in a final layer 1404 (e.g., layer n). The input layer 1402 may be configured to receive input data 1401 (e.g., sensor data, image data, sound data, observed data, automatically retrieved data, manually input data, etc.). The final layer 1404 may be configured to provide result data 1405.

There may be one or multiple hidden layers 1403, and the number j of nodes in each hidden layer 1403 may vary from embodiment to embodiment. Thus, the ANN 1400 may include any total number of layers (e.g., any number of the hidden layers 1403). One or more of the hidden layers 1403 may function as trainable feature extractors, which may allow mapping of the input data 1401 to the preferred result data 1405.

Figure 15:
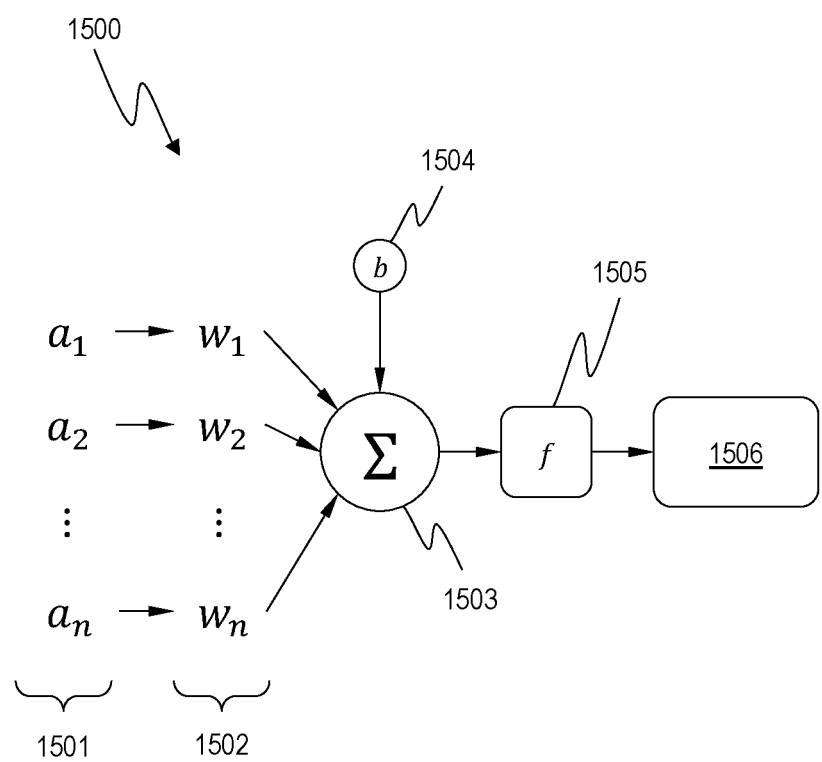
FIG. 15 illustrates a node, according to an embodiment.

FIG. 15 illustrates a node 1500, according to an embodiment. Each layer of a neural network may include one or more nodes similar to the node 1500, for example, nodes $x_1$-$x_i$, $x_1'$-$x_j'$, and $y_1$-$y_k$ depicted in FIG. 14. Each node may be analogous to a biological neuron.

The node 1500 may receive node inputs 1501 (e.g., $a_1$-$a_n$) either directly from the ANN's input data (e.g., the input data 1401) or from the output of one or more nodes in a different layer or the same layer. With the node inputs 1501, the node may perform an operation 1503, which while depicted in FIG. 15 as a summation operation, would be readily understood to include various other operations known in the art.

In some cases, the node inputs 1501 may be associated with one or more weights 1502 (e.g., $w_1$-$w_n$), which may represent weighting factors. For example, the operation 1503 may sum the products of each of the node inputs 1501 and the associated weights 1502 (e.g., $\Sigma a_i w_i$).

The result of operation 1503 may be offset with a bias 1504 (e.g., bias b), which may be a value or a function.

The output 1506 of the node 1500 may be gated using an activation (or threshold) function 1505 (e.g., function ƒ), which may be a linear or a non-linear function. The activation function 1505 may be, for example, a ReLU activation function or other function such as a saturating hyperbolic tangent, identity, binary step, logistic, arctan, softsign, parametric rectified linear unit, exponential linear unit, softPlus, bent identity, softExponential, Sinusoid, Sinc, Gaussian, or sigmoid function, or any combination thereof.

The weights 1502, the biases 1504, or threshold values of the activation functions 1505, or other computational parameters of the neural network, can be "taught" or "learned" in a training phase using one or more sets of training data. For example, the parameters may be trained using input data from a training data set and a gradient descent or backward propagation method so that the output value(s) (e.g., a set of predicted adjustments to classification or process control parameter settings) computed by the ANN may be consistent with the examples included in the training data set. The parameters may be obtained, for example, from a back propagation neural network training process, which may or may not be performed using the same hardware as that used for automated classification or adaptive, real-time deposition process control.

Decision tree-based expert systems may be supervised learning algorithms designed to solve entity classification problems or process control problems by applying a series of conditional (e.g., if-then) rules. Expert systems may include two subsystems: an inference engine and a knowledge base. The knowledge base may include a set of facts (e.g., a training data set including entity data for a series of entities, and the associated entity classification data provided by, for example, a skilled operator, technician, or inspector) and derived rules (e.g., derived entity classification rules). The inference engine may then apply the rules to input data for a current entity classification problem or process control problem to determine a classification of the entity or a next set of process control adjustments.

Autoencoders (also sometimes referred to as an auto-associator or Diabolo network), may be an ANN used for unsupervised and efficient mapping of input data (e.g., entity data or process data), to an output value (e.g., an entity classification or optimized process control parameters). Autoencoders may be used for the purpose of dimensionality reduction, that is, a process of reducing the number of random variables under consideration by deducing a set of principal component variables. Dimensionality reduction may be performed, for example, for the purpose of feature selection (e.g., selecting a subset of the original variables) or feature extraction (e.g., transforming of data in a high-dimensional space to a space of fewer dimensions).

Figure 16:
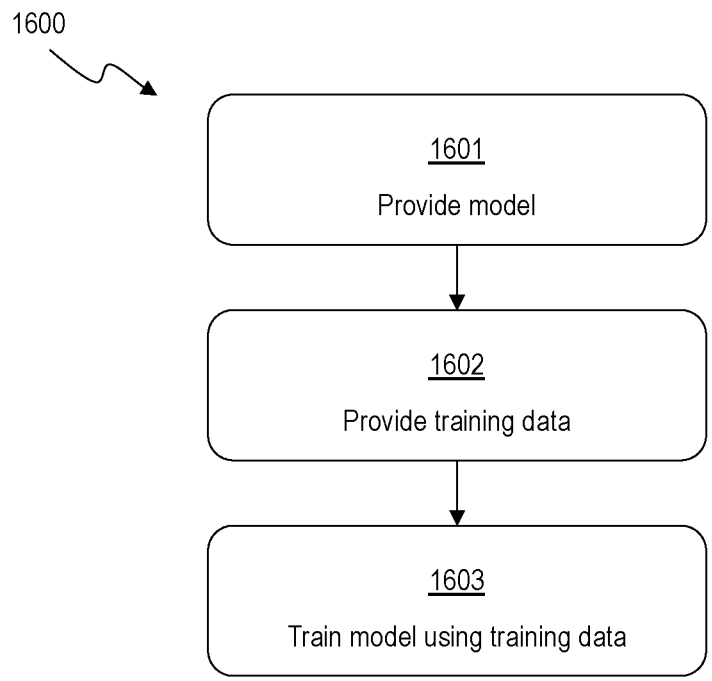
FIG. 16 illustrates a method of training a machine learning model of a machine learning module, according to an embodiment.

FIG. 16 illustrates a method 1600 of training a machine learning model of a machine learning module, according to an embodiment. Use of method 1600 may provide for use of training data to train a machine learning model for concurrent or later use.

At 1601, a machine learning model including one or more machine learning algorithms may be provided.

At 1602, training data may be provided. Training data may include one or more of process simulation data, process characterization data, in-process or post-process inspection data (including inspection data provided by a skilled operator and/or inspection data provided by any of a variety of automated inspection tools), or any combination thereof, for past processes that are the same as or different from that of the current process. One or more sets of training data may be used to train the machine learning algorithm used for object defect detection and classification. In some cases, the type of data included in the training data set may vary depending on the specific type of machine learning algorithm employed.

At 1603, the machine learning model may be trained using the training data. For example, training the model may include inputting the training data to the machine learning model and modifying one or more parameters of the model until the output of the model is the same as (or substantially the same as) external validation data. Model training may generate one or more trained models. One or more trained models may be selected for further validation or deployment, which may be performed using validation data. The results produced by each trained model for the validation data input to the training model may be compared to the validation data to determine which of the models is the best model. For example, the trained model that produces results most closely matching the validation data may be selected as the best model. Test data may then be used to evaluate the selected model. The selected model may also be sent to model deployment in which the best model may be sent to the processor for use in a post-training mode.

Figure 17:
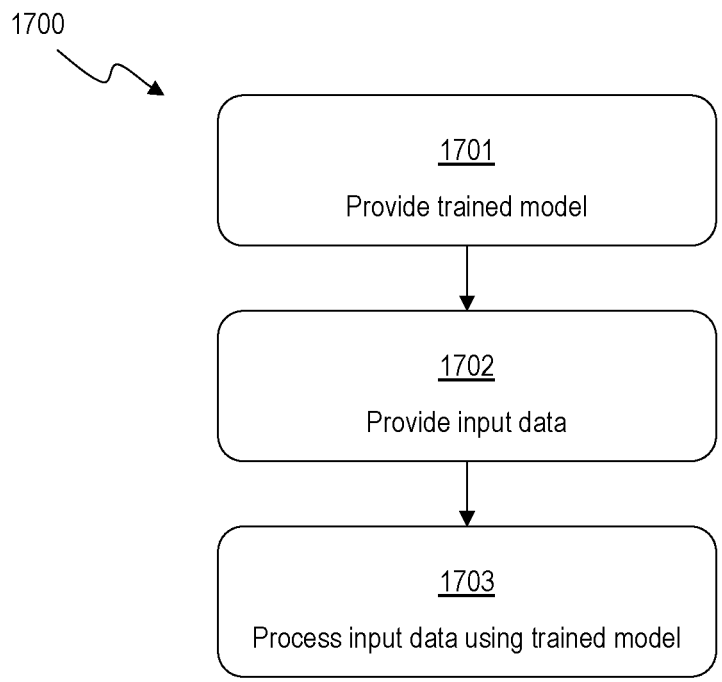
FIG. 17 illustrates a method of analyzing input data using a machine learning module, according to an embodiment.

FIG. 17 illustrates a method 1700 of analyzing input data using a machine learning module, according to an embodiment. Use of the machine learning module described by method 1700 may enable, for example, automatic classification of an entity or optimized process control.

At 1701, a trained machine learning model may be provided to the machine learning module. The trained machine learning model may have been trained, or under continuous or periodic training by one or more other systems or methods. The machine learning model may be pre-generated and trained, enabling functionality of the module as described herein, which can then be used to perform one or more post-training functions of the machine learning module.

For example, the provided trained machine learning model may be similar to the ANN 1400, include nodes similar to the node 1500, and may have been trained (or be under continuous or periodic training) using a method similar to the method 1600.

At 1702, input data may be provided to the machine learning module for input into the machine learning model. The input data may result from or be derived from a variety of different sources, similar to the input data 1401.

The provision of input data at 1702 may further include removing noise from the data prior to providing it to the machine learning algorithm. Examples of data processing algorithms suitable for use in removing noise from the input data may include, inter alia, signal averaging algorithms, smoothing filter algorithms, Kalman filter algorithms, non-linear filter algorithms, total variation minimization algorithms, or any combination thereof.

The provision of input data at 1702 may further include subtraction of a reference data set from the input data to increase contrast between aspects of interest of an entity or process and those not of interest, thereby facilitating classification or process control optimization. For example, a reference data set may include input data for a real or contrived ideal example of the entity or process. If an image sensor or machine vision system is used for entity observation, the reference data set may include an image or set of images (e.g., representing different views) of an ideal entity.

At 1703, the machine learning module may process the input data using the trained machine learning model to yield results from the machine learning module. Such results may include, for example, an entity classification or one or more optimized process control parameters.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A method, comprising:
    receiving, at a processor, via an opt-out application for initiating a process of opting-out or removing information from an online application, an individual's private information, wherein:
        the processor is configured to access one or more online user applications via a network interface, the network interface being in electronic communication with the processor and an internet service provider; and
        the individual's private information is information the individual seeks to opt-out from sharing via one of the one or more online user applications or remove from one of the one or more online user applications;
    accessing, using the processor, the one or more online user applications;
    searching, using the processor, for the individual's private information on the one or more online user applications;
    receiving, using the processor, a request to opt-out from sharing the individual's private information via one of the one or more online user applications or remove the individual's private information from the one of the one or more online user applications;
    configuring, using the processor, an instruction for executing the request on the one of the one or more online user applications;
    transmitting, using the processor, the instruction to the one of the one or more online user applications;
    receiving, at the processor, from the one of the one or more online user applications, a confirmation that the opt-out or removal completed;
    classifying the instruction as a successful opt-out instruction;
    training, using the processor, a machine learning model, wherein:
        an input layer of the machine learning model comprises the individual's private information and a user credential for one of the one or more online user applications; and
        an output layer of the machine learning model comprises the successful opt-out instruction.

2. The method of claim 1, wherein the instruction further includes a notification directed at the one of the one or more online user applications of a privacy right of the individual.

3. The method of claim 1, wherein the one or more online user applications includes a social media service, a background check service, a criminal history service, a search engine service, or a credit reporting service.

4. The method of claim 1, further comprising, setting, using the processor, a default search engine of the individual to a privacy-friendly search engine.

5. The method of claim 1, further comprising, prior to transmitting the request:
    sending, using the processor, a verification link to an email address of the individual; and
    receiving, at the processor, verification that the individual navigated to the verification link.

6. The method of claim 1, further comprising:
    displaying, using the processor, a list of search results from searching for the individual's private information on the one or more online user applications; and
    receiving, at the processor, a selection of one of the search results by the individual.

7. The method of claim 1, further comprising:
    displaying, using the processor, a list of search results from searching for the individual's private information on the one or more online user applications; and
    wherein the request includes additional requests for each of the one or more online user applications.

8. The method of claim 1, wherein the instruction comprises a predetermined configuration of privacy settings of the individual within the one of the one or more online user applications.

9. The method of claim 1, further comprising:
    storing, using the processor, an identifier of the one of the one or more online user applications in a public database; and
    storing, using the processor, the trained model associated with the identifier in a private database associated with the public database.

10. A method, comprising:
    receiving, at a processor:
        via an opt-out application for initiating a process of opting-out or removing information from an online application, an individual's private information, wherein the processor is configured to access an online user application via a network interface, the network interface being in electronic communication with the processor and an internet service provider; and
        a trained machine learning model, wherein:
            an input layer of the machine learning model comprises the individual's private information and a user credential for the online application; and
            an output layer of the machine learning model comprises an opt-out instruction;
    accessing, using the processor, the online user application;
    searching, using the processor, for the individual's private information on the online user application;
    executing the trained machine learning model using the individual's private information and the user credential, thereby generating an opt-out instruction;
    transmitting, using the processor, the opt-out instruction to the online user application; and
    receiving, at the processor, from the online user application, a confirmation that the opt-out or removal is completed.

11. The method of claim 10, further comprising:
    identifying, using the processor, a second online user application containing private data related to the individual; and
    wherein a presence of the private data on the second online user application was previously unknown to the individual.

12. The method of claim 10, further comprising:
    modifying, using the processor, a privacy setting or policy of the online user application to conform to a predetermined uniform policy term library; and
    displaying, using the processor, the modified privacy setting or policy, for the individual to access.

13. The method of claim 10, wherein the individual's private information is that of a relative of a requestor of the opt-out instruction and the online user application is an ancestral research service.

14. A method, comprising:
receiving, at a processor, via an opt-out application, an individual's private information, wherein the processor is configured to access an online user application via a network interface, the network interface being in electronic communication with the processor and an internet service provider;
accessing, using the processor, the online user application;
searching, using the processor, for the individual's private information on the online user application;
receiving, using the processor, a request to opt-out from sharing the individual's private information via the user application or remove the individual's private information from the user application;
executing a trained machine learning model using the individual's private information to generate an opt-out instruction;
transmitting, using the processor, the opt-out instruction to the online user application; and
receiving, at the processor, from the online user application, a confirmation that the opt-out or removal is completed.

15. The method of claim 14, further comprising:
classifying the request as a successful opt-out request;
training, using the processor, the machine learning model, wherein:
an input layer of the machine learning model comprises the individual's private information and a user credential for the online user application; and
an output layer of the machine learning model comprises the successful opt-out request.

16. The method of claim 14, further comprising requesting, using the processor, a confirmation from the individual to complete the request.

17. The method of claim 14, further comprising applying an opt-out policy on behalf of an individual automatically based upon their place of residence.

18. The method of claim 14, further comprising compiling, using the processor, a report, comprising a description of the individual's private information found on the online user application.

19. The method of claim 14, further comprising prompting, using the processor, the individual to input whether additional searches for the individual's private information should be performed on one or more other online user applications.

20. The method of claim 14, further comprising:
monitoring, using the processor, one or more other online user applications for a presence of the individual's private information; and
alerting, using the processor, the individual of the presence of the individual's private information on one of the one or more other online user applications.

* * * * *